(12) United States Patent
Han et al.

(10) Patent No.: US 6,902,111 B2
(45) Date of Patent: Jun. 7, 2005

(54) METHOD AND APPARATUS FOR IMPEDING THE COUNTERFEITING OF DISCS

(76) Inventors: Wenyu Han, 5C Marten Rd., Princeton, NJ (US) 08540; Victor Zazzu, 22 Monroe Ave., Belle Mead, NJ (US) 08502

( * ) Notice: Subject to any disclaimer, the term of this patent is extended or adjusted under 35 U.S.C. 154(b) by 0 days.

(21) Appl. No.: 10/218,009

(22) Filed: Aug. 13, 2002

(65) Prior Publication Data

US 2003/0034400 A1 Feb. 20, 2003

Related U.S. Application Data

(63) Continuation-in-part of application No. 09/745,512, filed on Dec. 22, 2000, which is a continuation-in-part of application No. 09/190,760, filed on Nov. 12, 1998, now Pat. No. 6,193,156.

(51) Int. Cl.$^7$ ................................................. G06K 7/14
(52) U.S. Cl. .................... 235/454; 235/492; 235/488
(58) Field of Search ............................ 235/492, 380, 235/454, 487, 488, 441, 440; 369/100, 103, 106

(56) References Cited

U.S. PATENT DOCUMENTS

| | | | | | |
|---|---|---|---|---|---|
| 5,787,068 A | * | 7/1998 | Arps et al. | ................ | 369/275.3 |
| 5,793,502 A | * | 8/1998 | Bianco et al. | ................. | 359/2 |
| 5,815,484 A | * | 9/1998 | Smith et al. | .............. | 369/275.1 |
| 5,862,117 A | * | 1/1999 | Fuentes et al. | .............. | 369/100 |
| 5,930,217 A | * | 7/1999 | Kayanuma | .................... | 235/454 |
| 6,009,057 A | * | 12/1999 | Furukawa et al. | ......... | 369/52.1 |
| 6,029,259 A | * | 2/2000 | Sollish et al. | ................ | 714/719 |
| 6,434,109 B2 | * | 8/2002 | Rollhaus et al. | ............. | 369/286 |
| 6,445,523 B2 | * | 9/2002 | Thomas et al. | ................ | 360/48 |
| 6,646,967 B1 | * | 11/2003 | Garcia | ..................... | 369/53.21 |

* cited by examiner

Primary Examiner—Ahshik Kim
(74) Attorney, Agent, or Firm—Henry I. Schanzer, Esq.

(57) ABSTRACT

One aspect of the invention includes one or more security devices embedded on one of the two surfaces, or between the two surfaces, of a compact disc (CD) or digital video disc (DVD) to impede the counterfeiting of the disc. The security devices may be, for example, holograms, optically variable devices (OVD) or RFID chips. CD/DVD is an authorized (non-pirated) version of a manufacturer's product. A system embodying the invention includes a player/reader which contains means for sensing selected characteristics of the security devices embedded on or within a CD/DVD and which is programmed to ascertain that the CD/DVD is in fact a valid document. Another aspect of the invention may include encrypting apparatus for reading/sensing selected characteristics of security device(s) and for annotating the disc and/or the security device(s) with corresponding information. Still another aspect includes a player/reader which is programmed to sense selected characteristics of security device(s) and/or to read information written back onto the disc and/or on the security device and to compare the information to ascertain the validity of the disc.

51 Claims, 34 Drawing Sheets

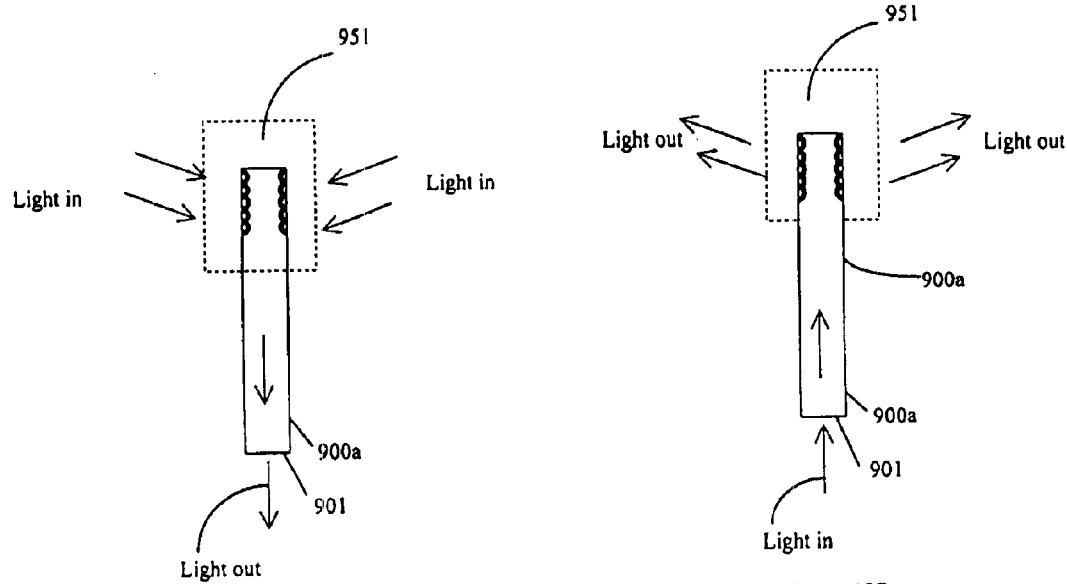
Figure 16A
Figure 16B
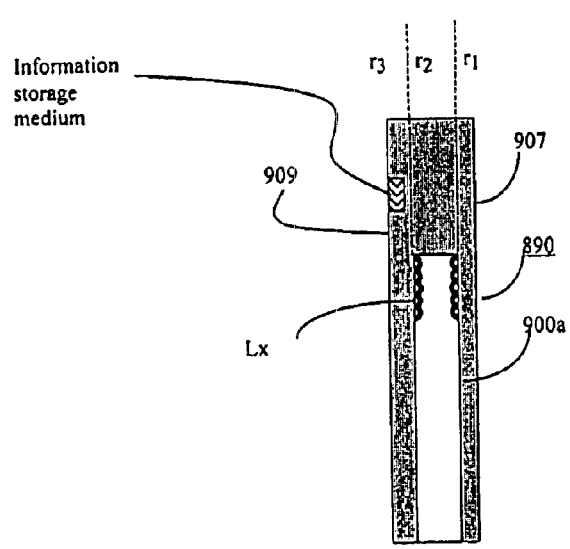
Figure 17A

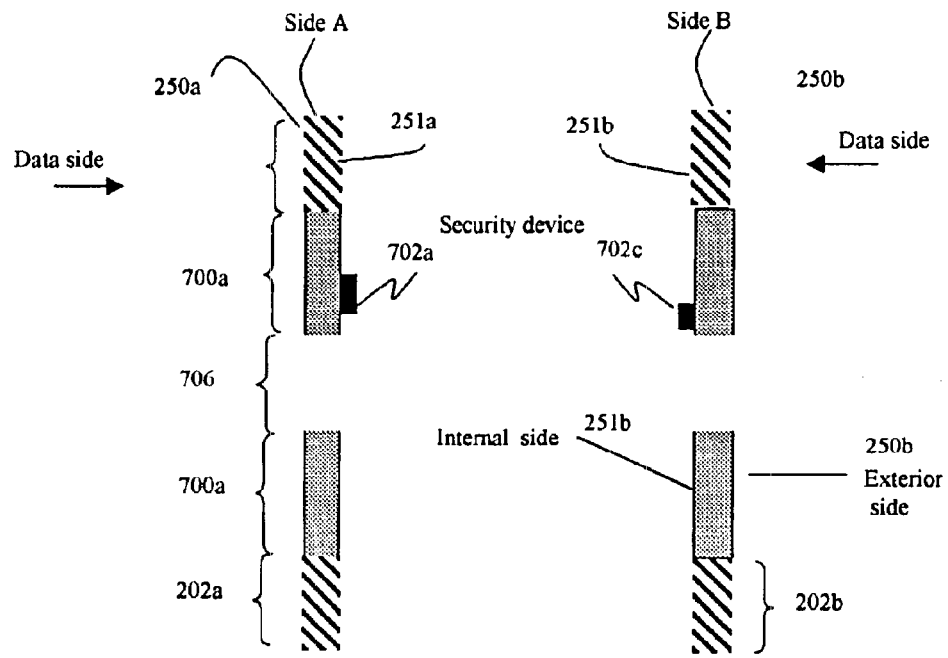
Figure: 25A
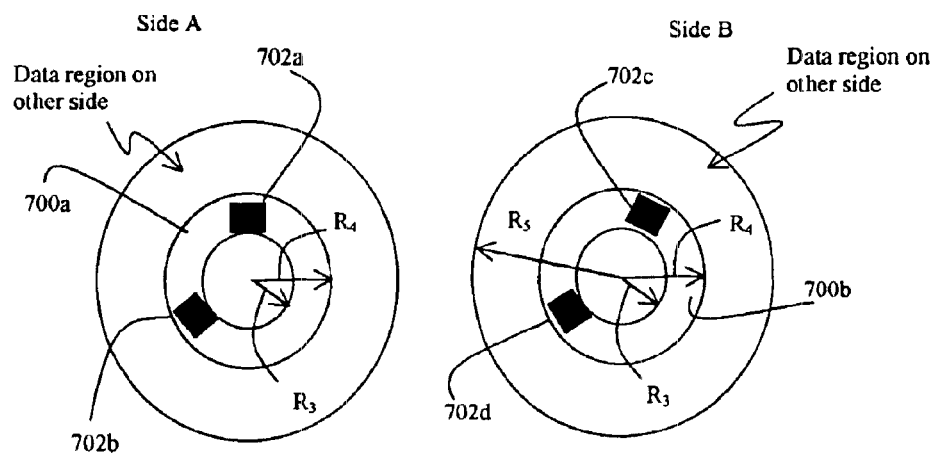
Figure: 25B

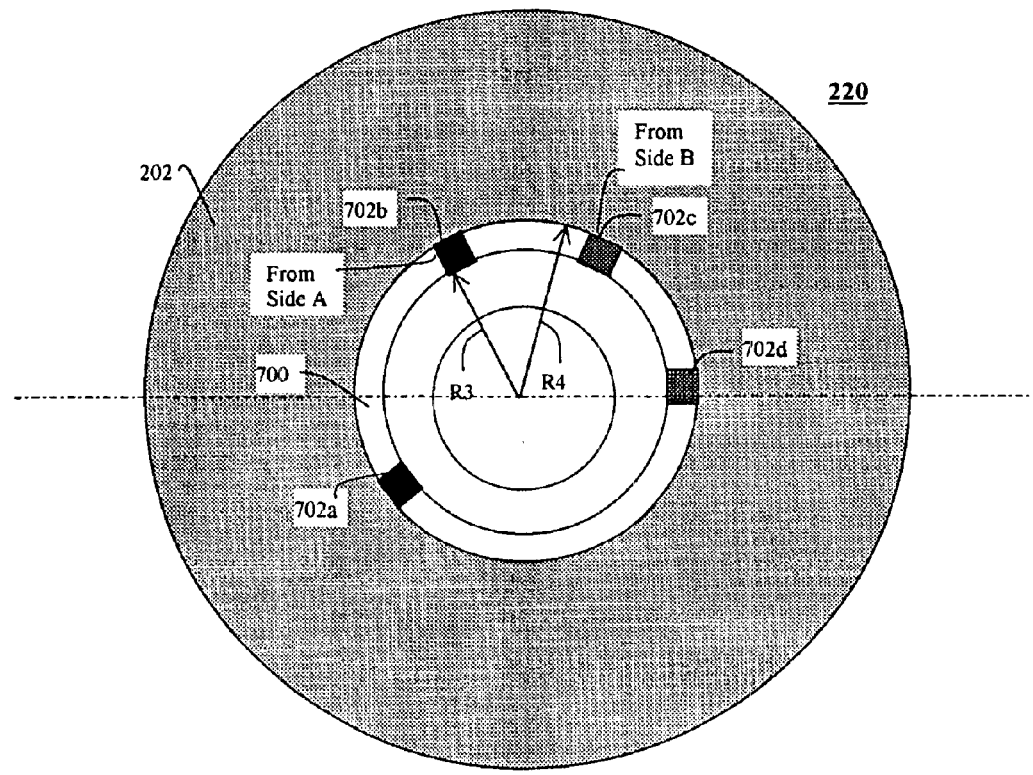
Figure 26A
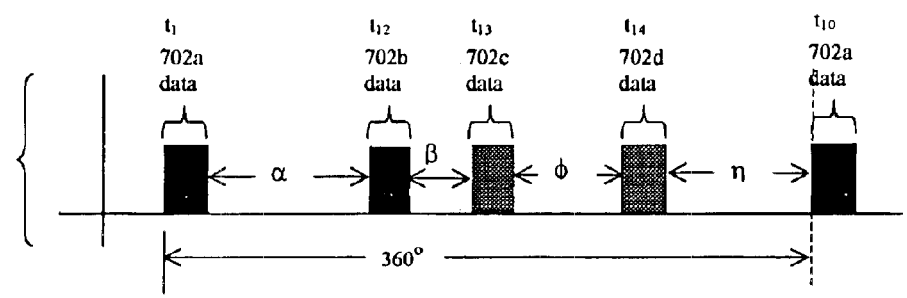
Figure 26A1

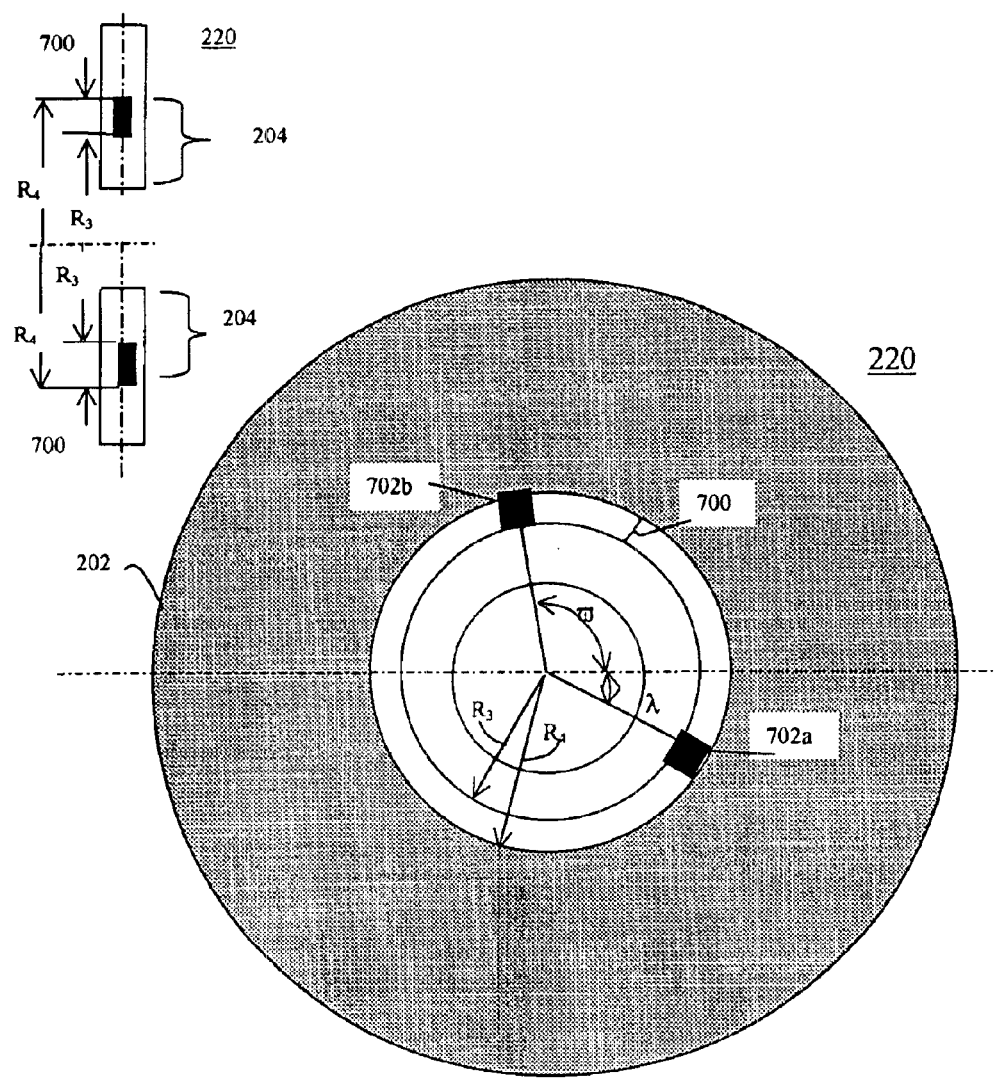
Figure 26B
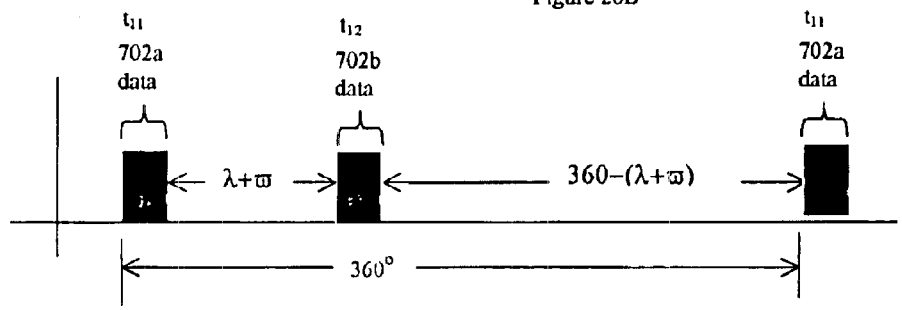
Figure 26B1

METHOD AND APPARATUS FOR IMPEDING THE COUNTERFEITING OF DISCS

CROSS REFERENCES TO RELATED APPLICATIONS

This application is a continuation-in-part of U.S. patent application Ser. No. 09/745,512 filed Dec. 22, 2000 which in turn is a continuation-in-part of U.S. patent application Ser. No. 09/190,760 filed Nov. 12, 1998 now U.S. Pat. No. 6,193,156. The teachings of these prior filed applications are incorporated herein by reference.

BACKGROUND OF THE INVENTION

This invention relates to valuable devices such as, for example, computer disc (CDs) and digital video discs (DVDs) and in particular to methods and apparatus for patterning or encoding these devices to impede their being copied without authorization.

For ease of discussion the invention will be illustrated using CDs and DVDs. However, it should be understood that in the specification to follow and in the appended claims, when reference is made to CDs and/or DVDs other devices and instruments are included, although not specifically identified as such.

CDs and DVDs are subject to being counterfeited ("pirated") by individuals or entities who copy true, authorized or valid CDs and DVDs.

As noted in the above identified applications Ser. Nos. 09/745,512 and 09/190,760, the inventive concepts described for impeding the counterfeiting of cards, instruments and documents are also applicable to systems for impeding the counterfeiting ("pirating") of optical data storage discs. Optical data storage discs may include compact discs (CDs) and digital video discs (DVDs). A difference between CDs and DVDs is that the CD may have information stored on only one exterior surface while a DVD may have information stored on both exterior surfaces. Thus, in the case of a CD, information is optically read from only one side, while in the case of a DVD information is read from both sides, but normally only one side at a time.

Also, as noted above, there is a significant problem related to the counterfeiting ("pirating" and "copying") of DVDs and CDs. Major software companies (e.g., Microsoft, Sony) are losing a significant amount of revenue due to the falsification of their intellectual property in the form of counterfeit CDs and DVDs. This problem is especially rampant in Asian countries where the amount of counterfeit products can be in excess of 90%.

Many different schemes have been tried to impede the counterfeiting of CDs and DVDs using digital encryption techniques. Some of these schemes are very clever, but they are prone to being undone by any "hacker" setting his/her mind to breaking the encrypted code.

SUMMARY OF THE INVENTION

One aspect of this invention includes the embedding of a security device [e.g., a machine readable hologram, an optically variable device (OVD) or a radio frequency identification (RFID) chip] on one of the two surfaces or between the two surfaces (i.e., top and bottom surfaces) of a CD or DVD disc. In accordance with the invention, after the security device is placed on or between the two surfaces, the security device can not be readily accessed. Any attempt to access the security device by an unauthorized copier results in the physical and/or functional destruction of the security device and/or the disc. Thus, one aspect of the invention includes the placement of a security device on or within a CD/DVD to impede unauthorized copying or manufacturing of the true manufacturer's products. Since a counterfeiter has to uncover the nature or characteristics of the true manufacturer's security device(s) on the disc and replicate them on a counterfeit copy, the difficulty and cost of producing counterfeit products has been greatly increased. The use of security device(s) in accordance with the invention thus increases the probability that a CD/DVD disc is an authorized (non-pirated) version of a manufacturer's product.

A system embodying the invention may include a player/reader which contains means for sensing selected characteristics of a security device(s) on a CD/DVD and which is programmed to ascertain that the CD/DVD is in fact a valid document.

A system embodying the invention may also include an encrypting machine for reading/sensing selected characteristics of one or more security device(s) present on a disc and for annotating the disc and/or the security device(s) with corresponding information; i.e., the encrypting machine "writes-back" security information onto the disc and/or the security device(s). Discs so produced include one or more security devices and may also be annotated to include selected information pertaining to selected security devices.

Systems embodying the invention may also include a player/reader which is programmed to sense selected characteristics of security device(s) present on a disc and/or to sense/read security information written back onto the disc and/or on the security device and to compare the information written back with the sensed information to ascertain the validity of the disc.

BRIEF DESCRIPTION OF THE DRAWINGS

In the accompanying drawing like reference characters denote like components.

FIGS. 2D1 and 2D2 are side views of cards embodying the invention;

FIGS. 16A and 16B illustrate the use of "pitted" optical fibers for use in cards embodying the invention;

FIGS. 25A and 25B are simplified drawings of the two sides of a DVD with security devices attached to the sides, in accordance with the invention;

FIGS. 26A, 26A1, 26B and 26B1 illustrate different arrangements of security devices on a DVD and the corresponding signals they generate;

DETAILED DESCRIPTION OF THE INVENTION

Inventive concepts described for impeding the counterfeiting of cards, instruments, and documents are also applicable to systems for impeding the counterfeiting of optical data storage discs.

Figure 1:
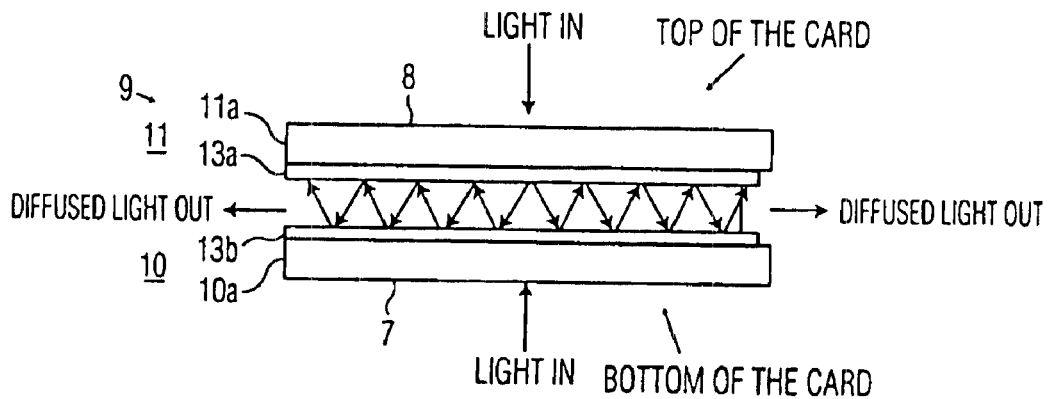
FIG. 1 is a cross-sectional diagram of a prior art card including a light path.

FIG. 1 shows a cross section of a prior art multi-layered card 9 formed such that the top and bottom layers of the card are spaced from each other to define a channel through which light can pass. The card includes a bottom layer 10 and a top layer 11. Each one of layers 10 and 11 includes an outer layer 10a, 11a, respectively, made of a translucent material. Outer layers 10a, 11a, have an outer surface 7,8, respectively. Each one of layers 10 and 11 also includes an inner layer on which is formed a semi-reflective layer 13a, 13b, respectively, spaced from each other. The semi-reflective layer may be an aluminum compound or an acrylic, or any like material. Light projected onto either one of the outer surfaces (7,8) of the card is captured between the reflective layers and travels between layers 13a and 13b of the card until it is emitted as a diffused light output along the side or edge of card 9. This method uses what may be termed edge glow technology in which a light reflective space is formed between the two (top and bottom) surfaces of the card so as to transmit light that has been projected onto the outer surfaces of the card and entered the card, and the light is transmitted towards the edge of the card in a diffused manner. This allows the edges of the card to glow.

Figure 2A:
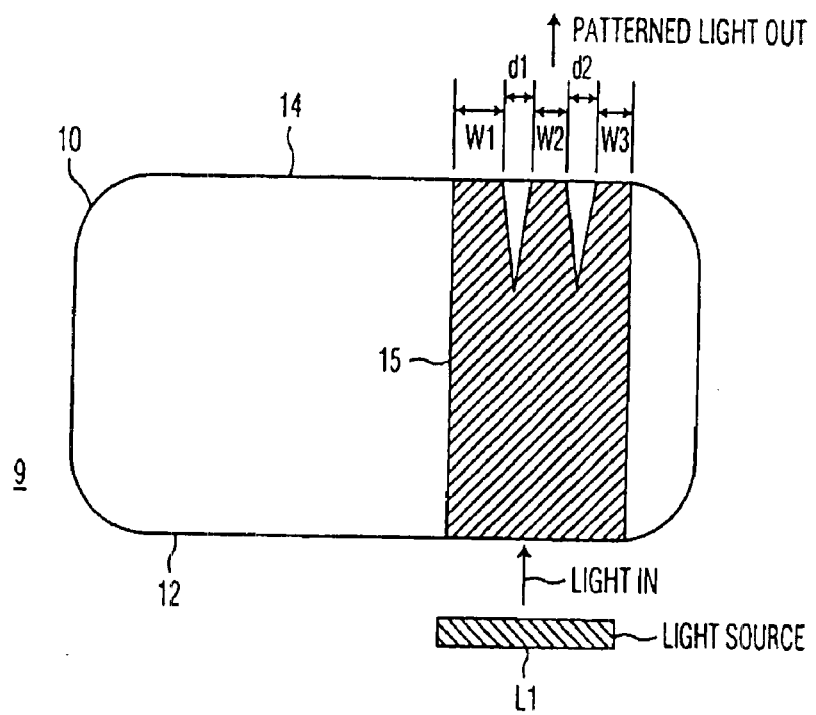
FIGS. 2A, 2B and 2C are cut-away views of cards formed with different light patterns in accordance with the invention.
Figure 2B:
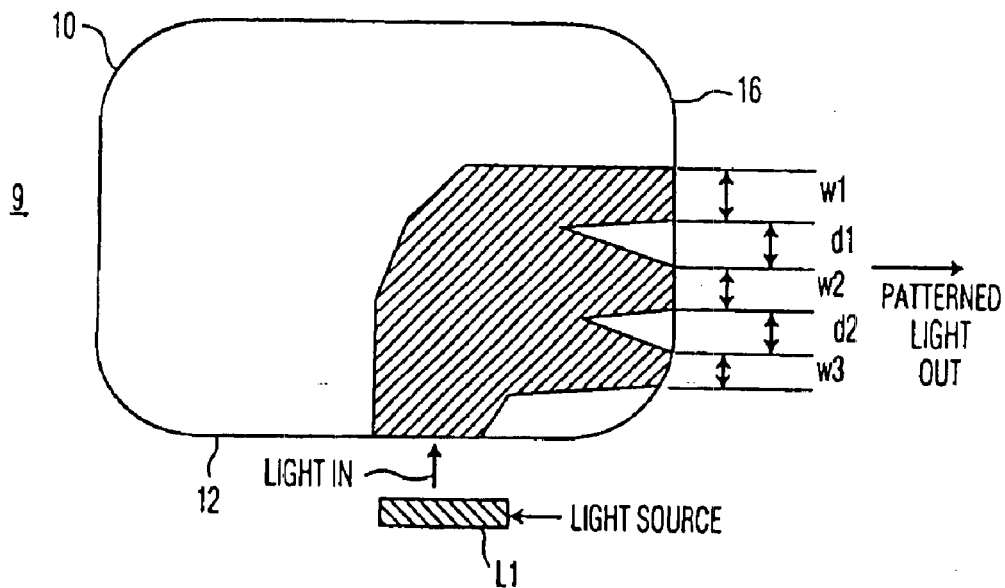
Figure 2C:
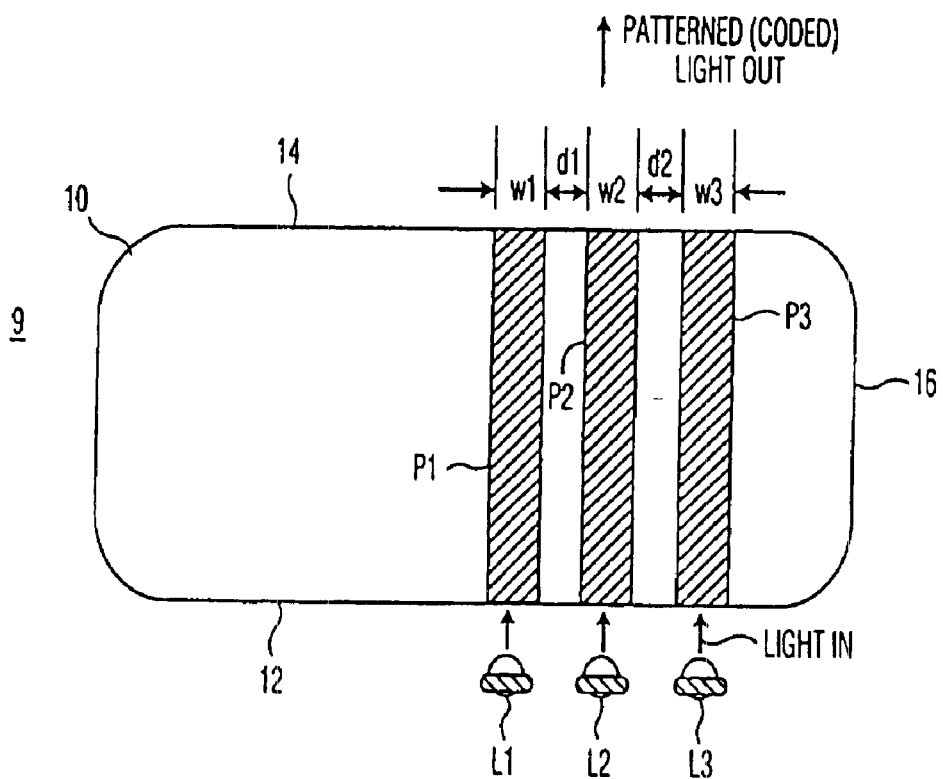
Figure 3:
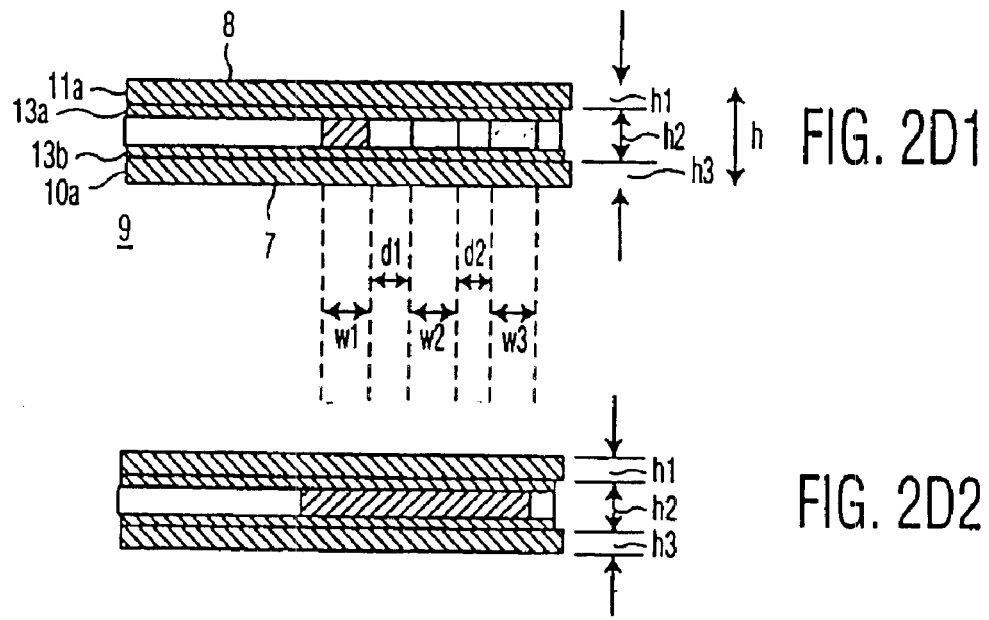
FIG. 3 is a cut-away view of the top of a card formed, in accordance with the invention, being illuminated by a light source and with its output pattern being read.
Figure 3:
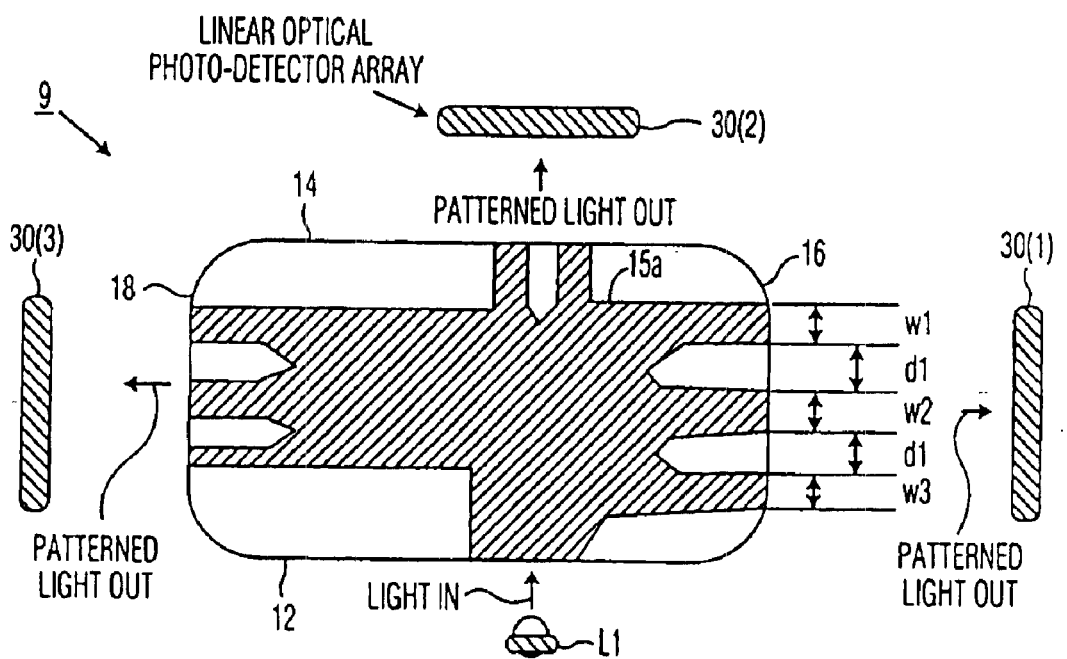

FIG. 2A shows a top view of the lower layer of a card containing a light pattern formed so as to extend from one side 12 of the card 9 and across the width of the card to the opposite side 14. FIG. 2B shows a top view of the lower layer of a card, 9, containing a light pattern which extends from one side 12 to another, adjacent, side 16, at a right angle to side 12. In FIGS. 2A and 2B the patterns may use one illumination source (as shown in FIG. 3) where the input light is projected so as to enter the edge (side) 12 of the card and the light energy is dispersed within the light pipe and then transmitted to three output sites. The light source may be a light emitting diode (LED) or any other suitable light source. For ease of illustration, in the discussion to follow, reference is made to visible light. However, it should be understood that in many embodiments of the invention, non-visible light (e.g., ultraviolet and infrared light) may be used. In FIGS. 2A and 2B, the width (W1, W2, W3) of each output site, as well as the spacing (d1, d2) between the various output sites, may be controlled (varied) in accordance with a code or program to render the cards more secure. In FIG. 2C, three separate and independent light pipes (P1, P2, P3) are formed between the top and bottom surfaces of the card. Each light pipe can then be illuminated with a different color LED (L1, L2, L3) and then detected with a color sensitive detector array. A reader to read the cards would require that the reader be used to illuminate the cards and be programmed or designed to operate with these cards.

FIG. 2D1 shows a side view looking into the light output side 14 of the card 9. The card 9 may have a total thickness or height (h) of approximately 30 mils. FIG. 2D2 shows a side view looking into the light input side 12 of card 9. The top and bottom surfaces, 11a and 10a, respectively, may each have a height of 10 mils and the coded light pattern is formed within a space also having a height of 10 mils. These values are by way of example only and the height of each layer may be made substantially greater or smaller, so long as the total height meets the general standards required of the cards.

FIG. 3 illustrates that a light pipe (path) pattern 15a may be formed on a card 9 such that light may be inputted on one side, 12, and a different output light pattern may be produced on the other three sides (16, 14 and 18) of the card. FIG. 3 also illustrates that a single light source, L1, may be used to illuminate the back end of the light pipe patterns shown in FIGS. 2A and 2B and that the input light energy is evenly dispersed and distributed to each of the three output sides, 14, 16, 18, depicted in FIG. 3. The light output emitted from each of the output sides then may be detected by an array of optical photodetectors, 30(1), 30(2) and 30(3). The photodetectors (or sensors) are used to measure the parameters associated with the output illumination of the light pipes (i.e., the widths W1, W2, W3 and the distances d1, d2). If the characteristics of the light received at each location are not within the specification then the card is determined to be false. Again, the reader to read these cards is programmed and/or designed to work/function with the cards. A reader embodying the invention would include:(a) means for activating a light source and projecting the light along the edge (side) of the cards;(b) photosensors for sensing the output light pattern ("coded" light output); and (c) decoding processing and memory circuitry for comparing the sensed information versus previously stored information to determine the validity of the cards.

Figure 4:
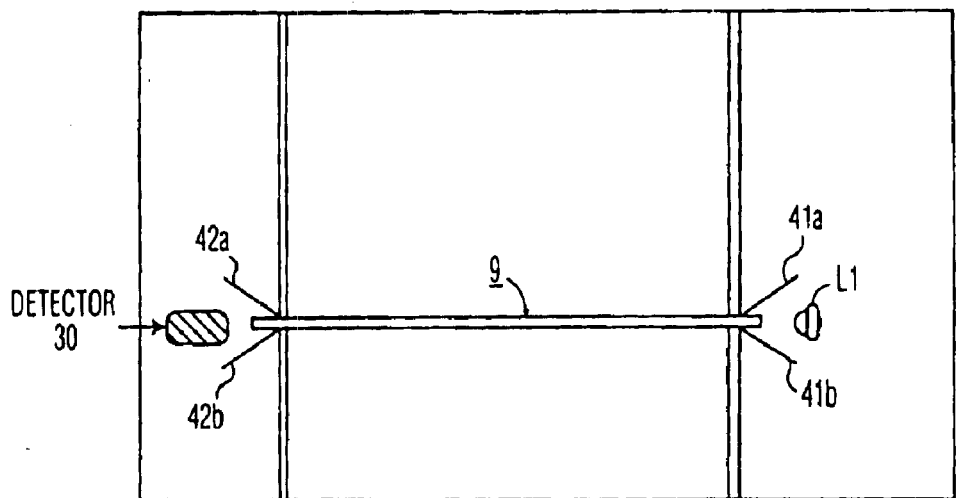
FIG. 4 is a cross-sectional view of a card embodying the invention mounted on a reader and being illuminated and its light output being detected in accordance with the invention.

FIG. 4 shows a cross-section of the illuminator/detector system for a card mounted in a reader housing. The reader provides a light source 4 which would project input light onto, and into, one side of the card and a photodetector, 30, for sensing the light output from another side (opposite or adjacent to the one side). Note that the illuminating system would include a light shade (41a41b) at the light input end to prevent illumination from the LEDs from skipping (passing) over the edge of the card and interfering with the detector. Likewise, the reader would include light shades (42a, 42b) at the light output end to allow the detector to only detect light output from the edge (side) of the card.

Figure 5:
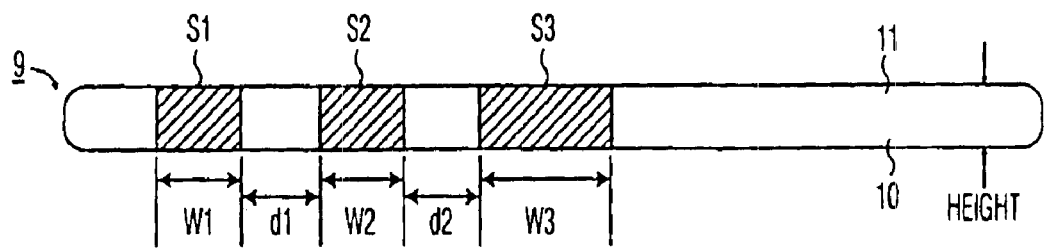
FIG. 5 is a side view of a card embodying the invention.

FIG. 5 shows a side (edge) of the card illustrating three site locations (S1, S2, S3) from which the light energy exits the card, 9. One method used to detect if the card has been falsified is to check the width (W1, W2, W3) of the light emitted from the various location sites and the width or distance (d1, d2) between the various site locations defining opaque areas. Similar to detecting conventional bar codes, the above detection scheme will be able to measure the precise illumination areas and the precise opaque areas. Techniques for detecting this type of information is known and need not be detailed.

The top and bottom surfaces (10, 11) of the cards may formed of an opaque material since the light output pattern is produced at one edge of the card by illuminating another edge of the card.

The light pipes can be made of a material that will only transmit a narrow frequency band (e.g., red, green or yellow). The optical detector will only then validate the card if the signal contains both the correct widths and the predetermined spectra.

Of course the bar/space pattern can be adjusted for each specific customer application. This will allow this technique to have a unique pattern (illumination/opaque) ratio for each application.

Figure 6A:
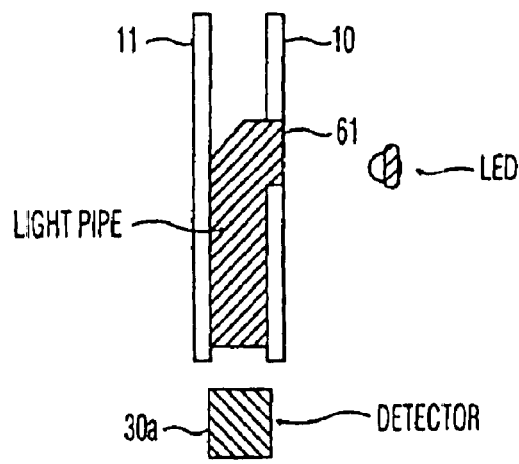
FIGS. 6A and 6B are, respectively, a side view and a front view of a card embodying the invention with either one of its top and bottom surfaces being illuminated.
Figure 6B:
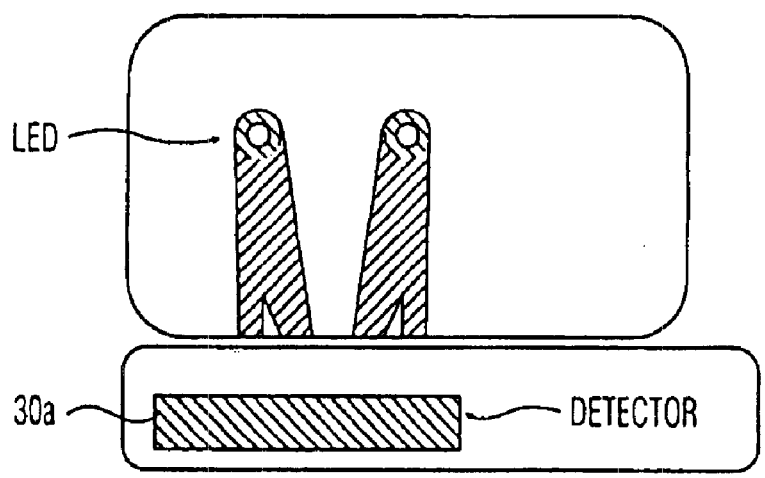

The light pipe formed in a card need not extend the entire length (or width) of the card. FIGS. 6A and 6B show different views of a card. In FIG. 6A the light pipe extends only partially along the width on the length of the card from one of the major surfaces of the card to one of the sides of the card. The light pipe is illuminated from one of the top and bottom surfaces and the light is bent at a 90 degree angle and directed towards one edge of the card; where the output light signal is then detected by a detector 30a. The embodiment of FIG. 6A enables the detection of security features by means of a reader, 101, shown in FIGS. 6C and 6D which uses a manual "swipe" technique (e.g., slot or "swipe" reader). In a manual "swipe" application, the card 9 is typically held in the hand of a user and the lower portion of the card is then inserted and swept through the reader 101.

Figure 6C:
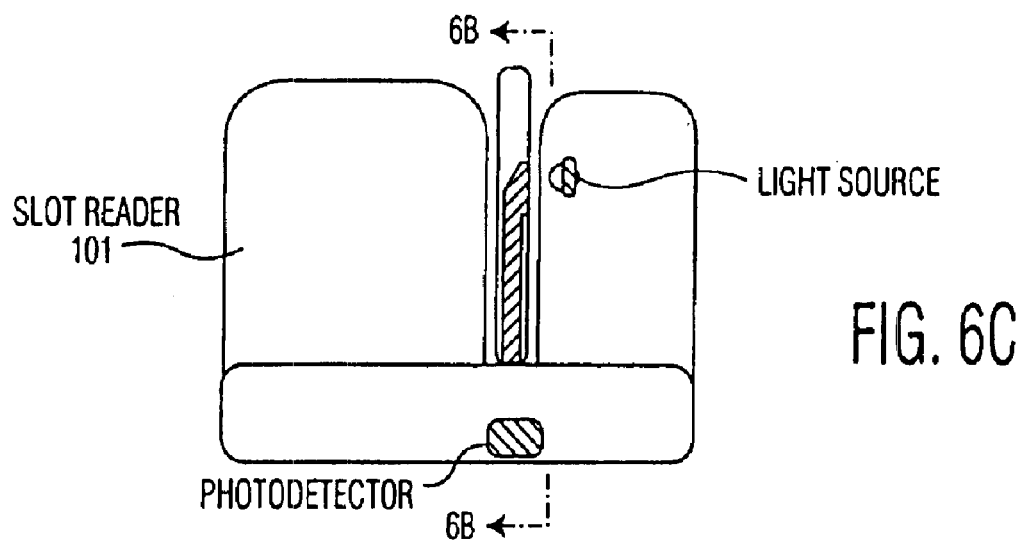
FIGS. 6C and 6D are respectively a side view and a front view of a slot reader with a card embodying the invention.
Figure 6D:
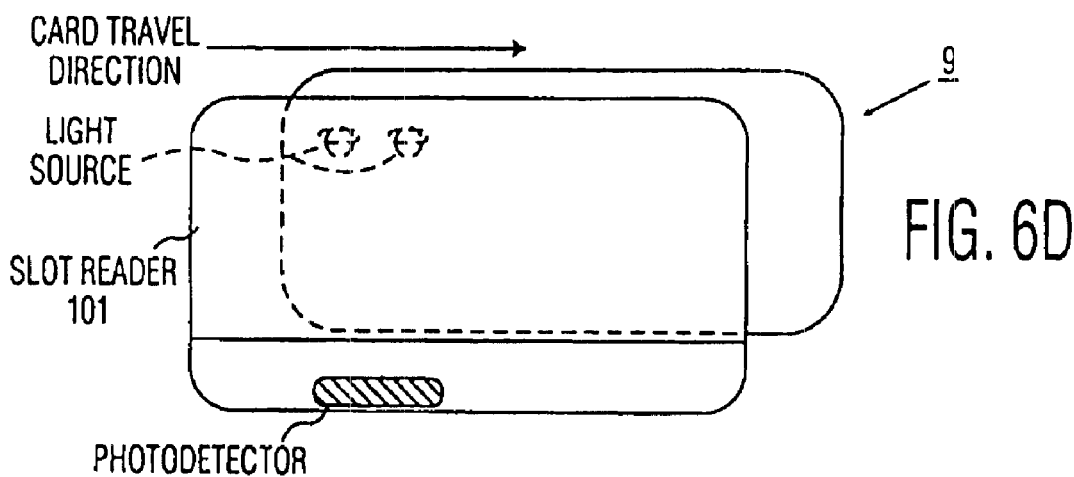

As shown in FIG. 6C, as the card is passed through a slot reader, the LEDs will illuminate one surface of the card and cause light to be projected via holes or cut-aways 61. When the LEDs align with the input to the light pipe, the detector 30a will detect the output light pattern produced at the edge of the card. If the light pattern at the edge of the card matches an appropriate configuration, previously stored or programmed in the reader, then the card will be deemed to be valid. In FIG. 6A, when the card surfaces are made opaque, the cut-out 61 to let light in is required. However, note that when the card surface (e.g., surface 10 in FIG. 6A) is made of a translucent material, there would be no need for holes or cut-aways 61.

Figure 6E:
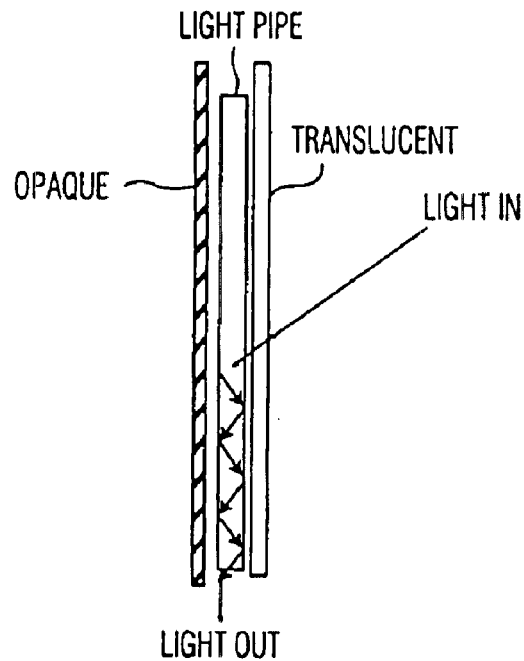
FIG. 6E is a cross-section of a card embodying the invention.

The position of the light and the detector can be interchanged. Thus, in FIG. 6A, one surface 10 of card 9 would be translucent while the other surface 11 could either be opaque or translucent, as shown in FIG. 6E. This is true for all of the embodiments of this invention.

Figure 7A:
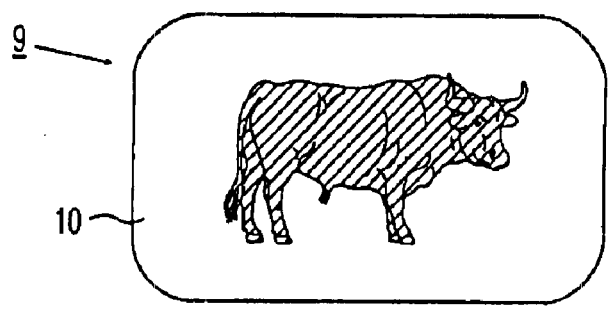
FIG. 7A is a front view of a card embodying the invention.
Figure 7B:
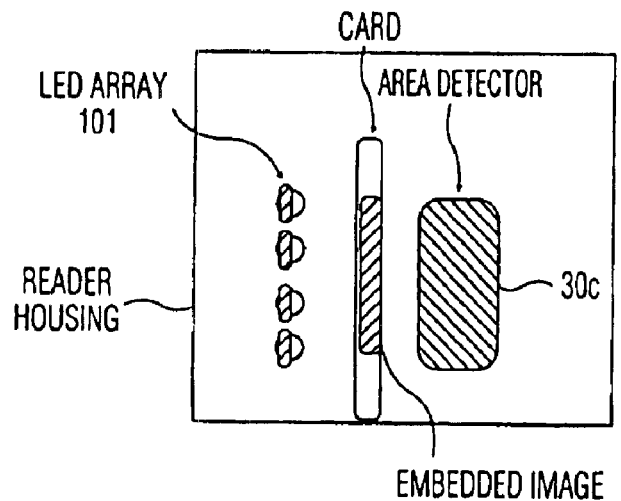
FIG. 7B is a side view of the card of FIG. 7A being illuminated in accordance with the invention.

It is within the ambit of the invention to have an embodiment of the invention in which a pattern is completely embedded within a card, as shown in FIG. 7A where the picture of a bull is completely embedded within the card. That is, the pattern is placed between the top and bottom surfaces of the card. As shown in FIG. 7B, the card may be placed in a reader housing such that the light is incident on one side of the card and an area detector 30c is placed on the other side of the card. As the card is inserted into a validation machine (reader), the LEDs illuminate one side of the card which is made of a translucent material. Light will, therefore, pass through the card. However, in the area where the "image of the bull" is located the light will not pass through. The presence or absence of light can then be detected by an area sensor 30C such as a CCD area sensor. If the embedded image matches the preprogrammed security image stored in the reader, the card is deemed valid In FIG. 8A a bar code is embedded between the top and bottom surfaces of a card whose material is selected such that when light is projected onto the top or bottom surface, the embedded bar codes block the light while light passes between the bars. In this embodiment, the top and bottom layers of the card would be made translucent.

Figure 8A:
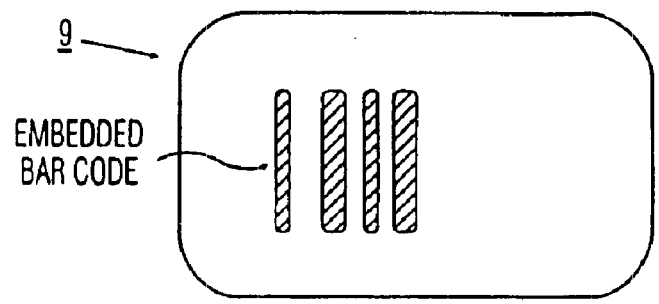
FIG. 8A is a front view of a card embodying the invention with embedded bar codes.
Figure 8B:
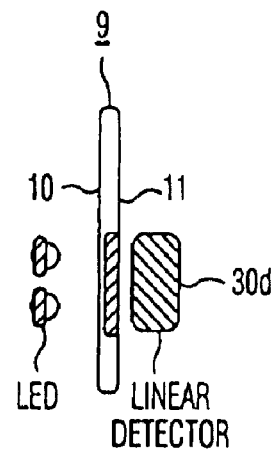
FIG. 8B is a side view of the card of FIG. 8A being illuminated and read in accordance with the invention.

FIG. 8B shows the basic elements needed to read the embedded bar code of FIG. 8A. A number of LEDs can be positioned opposite one surface so as to project their light onto a surface 10 of the card 9. A linear array of photosensors 30d mounted facing the other surface 11 of card 9, can sense the light passing through the card. This allows the detector to be a linear photosensor as opposed to a more expensive area sensor. The linear and/or area sensors could be charge coupled devices (CCDs) or any suitable sensor. The image or bar code can be opaque with the top and bottom layers of the card being translucent or, vice versa, the image may be translucent and the surrounding area being opaque. Thus, in FIGS. 7A, 7B, 8A and 8B, light can be projected onto one surface of a card in which a pattern is embedded and a patterned (or coded) light output is produced at the other surface. The patterned or coded light output can then be sensed or read by means of photosensors which can then provide signals to known detecting and processing circuits.

Figure 9A:
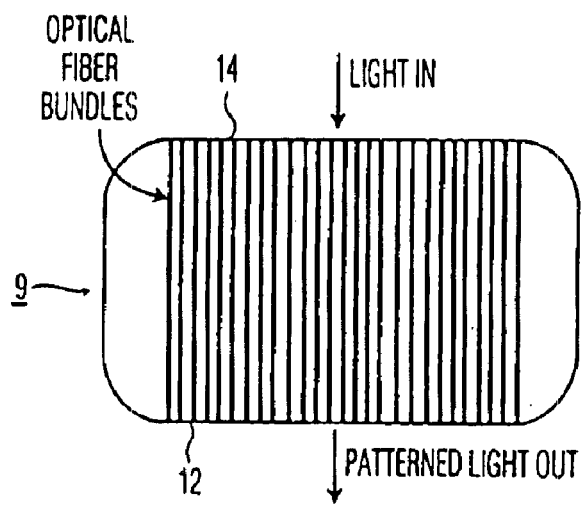
FIGS. 9A and 9B are front views of cards embodying the invention formed with fiber optic bundles.

FIG. 9A shows a card manufactured with a set of optical fibers embedded between the top and bottom surfaces of the card, 9. In FIG. 9A, a multiplicity of fiber optic light pipes (a fiber optic bundle) are shown distributed across the width of the card. The layer of fiber optics could also be placed across the entire length of the card or from one side to an adjacent, perpendicular, side. In FIG. 9A, a light source would illuminate one side (edge) of the card as shown by the arrow marked "LIGHT IN" and a light output would be produced at another side (edge), as shown by arrow marked "PATTERNED LIGHT OUT". In this embodiment, selected ones of the optical fibers could be selected to have different colors or to pass different wave lengths. Also, the spacing of the optical fibers could be made to vary.

It should be noted that a card may be personalized (customized) by, for example, breaking the fiber strands with a laser. In doing so each card can be personalized to have its own unique pattern, as shown in FIG. 9B.

Figure 9B:
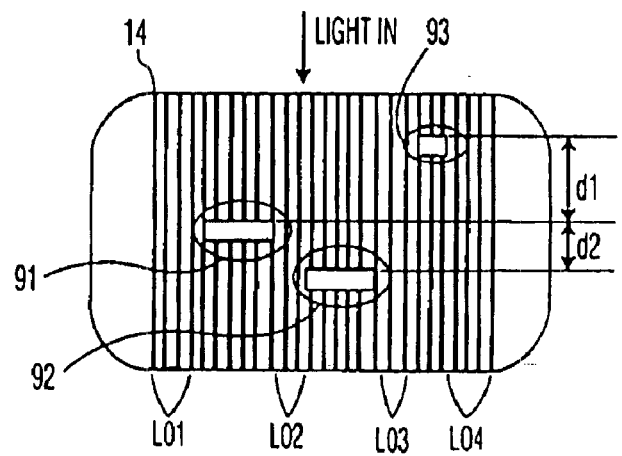

In FIG. 9B, selected groups of fiber optic strands may be cut (i.e. vaporized) with a laser (or by any other suitable means), as shown by the black stripes 91, 92 and 93 in FIG. 9B. Therefore, the broken strands of optical fibers will not carry light from the light input end of the card to the light output end. In this embodiment, all the fibers could be made identical in terms of their transmissive properties. By cutting selected groups of fiber optic strands a unique pattern can be produced and subsequently detected. However, in FIG. 9B, if the top or bottom surface of the card is translucent, the light input will produce light "marks" at 91, 92 and 93. Therefore, an area reader positioned over a surface of the card for sensing the light emitted at the surface of the card could be used to identify the presence of a light output pattern on the surface of the card.

Figure 9C:
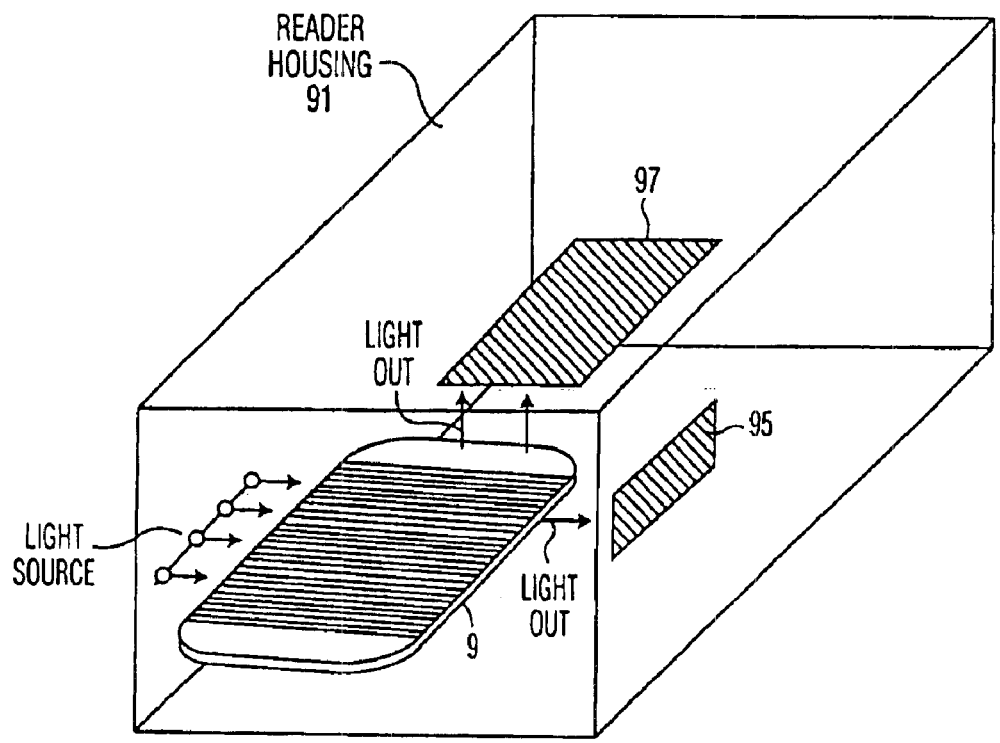
FIG. 9C is an isometric of a reader for reading a "fiber optic" card embodying the invention.

In FIG. 9C, a reader 91 capable of reading a card of the type shown in FIGS. 9A and 9B includes a light source to illuminate one edge of the card with an optical detector 95 located along a different edge and another optical detector 97 to read one of the surfaces of the card. The detector 97 is then programmed to scan the surface area of the card and to detect where the laser has burned the end of the fiber bundles. As the light leaks out of the end of the fiber bundle that is embedded within the card, it is possible to detect the location where the fibers have been burned. Then the distance between each of the laser cuts (d1 and d2) can be calculated and the information can then be stored on an information storage media on the card (such as a magnetic stripe or an integrated circuit memory).

Figure 9D:
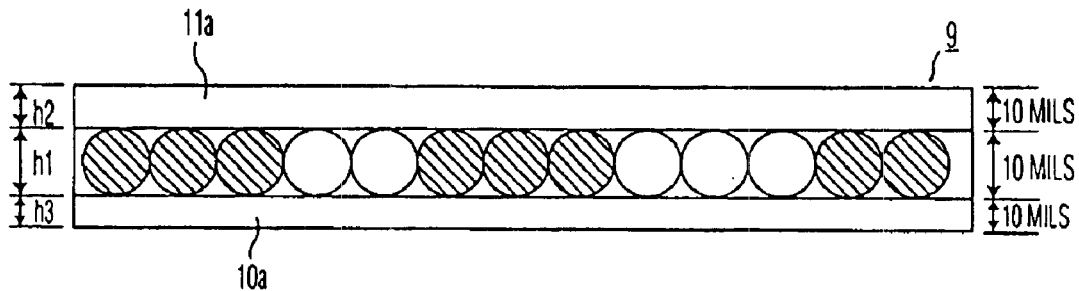
FIG. 9D is a cross-sectional diagram of a fiber optic card embodying he invention.

FIG. 9D is a side (cross-sectional) view of the card 9 showing an illuminated pattern. Note that the optical fibers are shown placed side by side. However, they could as well be spaced from each other. FIG. 9D shows that the fibers could be of 10 mils in diameter sandwiched between a top layer 11a and a bottom layer 10a. In the example of FIG. 9D, the height of the package is approximately 30 mils. However, it should be appreciated that the size of the optical fibers and the thickness of the top and bottom layers may be varied considerably.

Figure 10A:
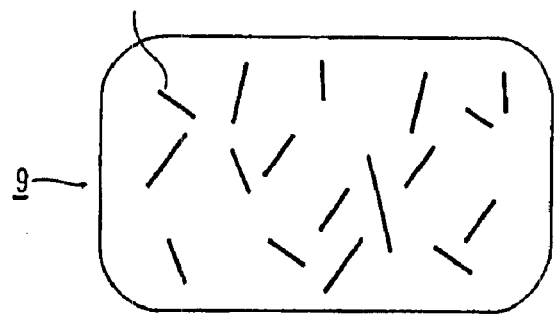
FIG. 10A is a top view of another card embodying the invention.
Figure 10B:
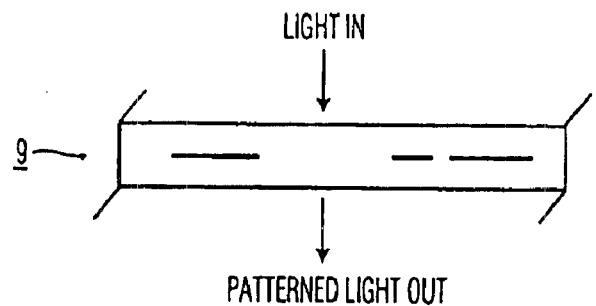
FIG. 10B is a side view of a card of the type shown in FIG. 10A.

FIG. 10A shows that a card may be formed by randomly placing optical fibers of different shapes, sizes and colors and/or randomly forming patterns of like colored optical fibers between the two surfaces of a card. The random pattern created can be read, sensed and recorded and then assigned to a particular individual as his signature or finger print card. The patterns may be read as shown in FIG. 10B by illuminating one surface and sensing the patterned (coded) light out. The fingerprint parameter can be stored on an information storage media such as a magnetic stripe or an IC memory located on the card. When the card is inserted into a validation reader, the unique fingerprint must match the data stored in the card to validate the card. Otherwise, the card will be rejected as invalid.

Figure 11A:
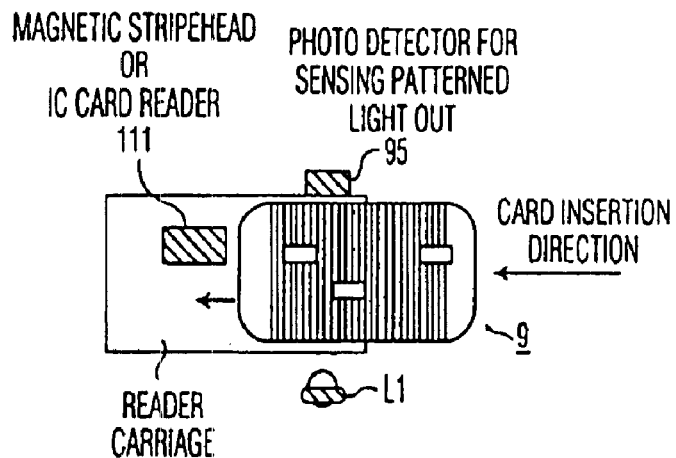
FIGS. 11A and 11B are a top and side view, respectively, of an insertion reader for reading cards embodying the invention.
Figure 11B:
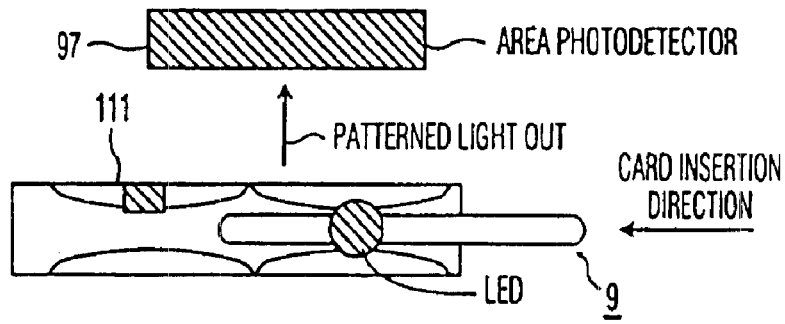

Readers/scanners to illuminate smart "light cards" embodying the invention and to sense the light pattern output may include an insertion reader (motorized or manual) or a slot reader. FIG. 11A is a top view of an insertion reader showing an optical fiber type card 9 being inserted into the reader carriage with a light L1 illuminating one side of the card and a photodetector 95 for sensing the light pattern outputted on the opposite side of the card. The reader may include an optimal magnetic stripe head or integrated circuit (IC) card reader 111. FIG. 11B is a side view of the reader showing an area photodetector 97 overlying the card 9 to sense the light pattern output emitted from the surface of the card.

The patterning and encoding of cards, as taught herein, may be combined with other prior art security enhancing means for rendering cards embodying the invention even more difficult to counterfeit.

Figure 12:
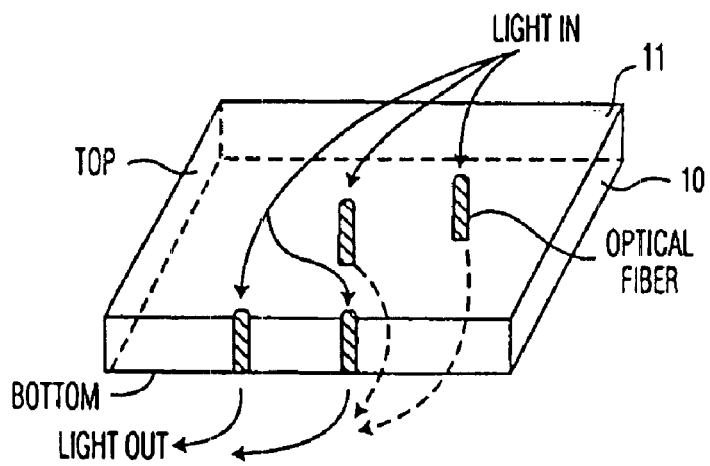
FIG. 12 is a top view of still another card embodying the invention.

FIG. 12 is a not to scale isometric drawing of a card (or other instrument) to illustrate that optical fibers and/or light pipes defining a predetermined pattern (or used to form a pattern) may be mounted parallel to the sides of the cards. A light input signal is then applied to one of the major surfaces of the card (e.g., the top surface) and a patterned (or coded) light output signal is produced at the other one of the major surfaces of the card (e.g., the bottom surface). The card could be any other instrument such as a CD ROM or disc.

The various embodiments of this invention could be incorporated into documents such as passports or visas.

Figure 13:
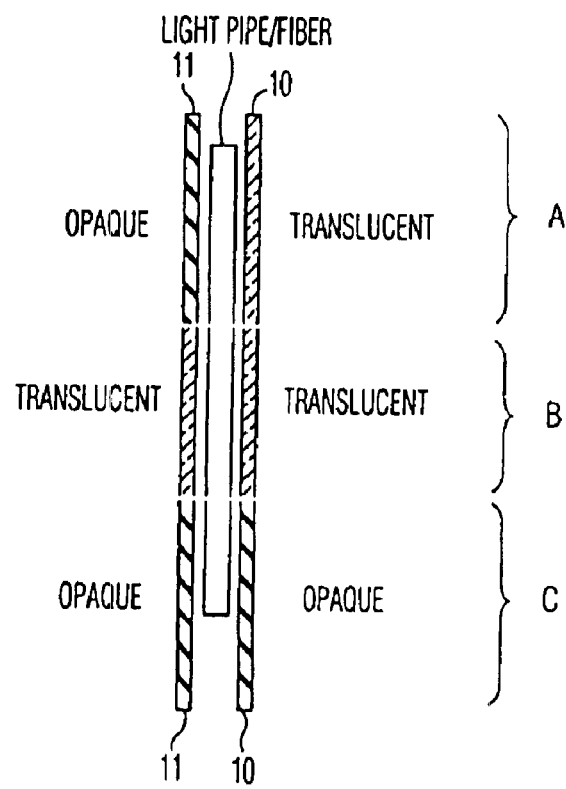
FIG. 13 is a conceptual diagram of a different card construction in accordance with the invention.

As shown in FIG. 13, cards, instruments and documents embodying the invention may include a light pipe or optical fiber sandwiched between two surfaces. Depending on the application, the surfaces may both be opaque, may both be translucent, or one may be opaque and the other translucent.

Figure 14A:
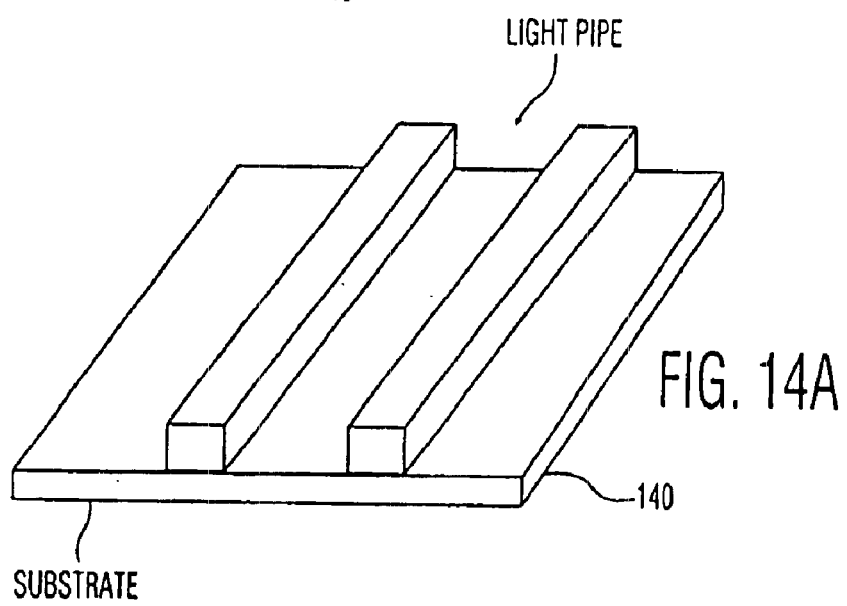
FIGS. 14A and 14B illustrate a method of forming cards embodying the invention.
Figure 14B:
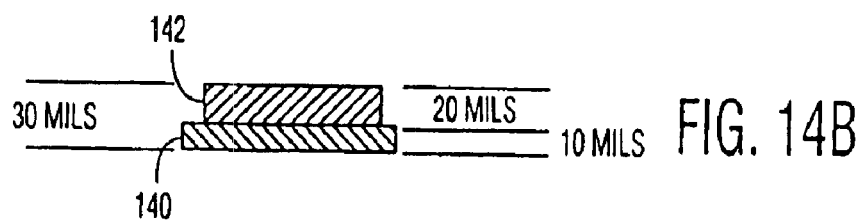

FIGS. 14A and 14B show that cards may be formed by first taking a substrate material 140 which may be opaque or translucent and which will eventually form the top or bottom surface of a card. The substrate material will normally have a thickness in the range of 1 to 15 mils, However, for purpose of illustration it is shown to be 10 mils in these figures. An acrylic material 142 may then be formed on top of the substrate, as shown in FIG. 14B. The material 142 may then be patterned by any known techniques to produce a light pipe as shown in FIG. 14A. A cover (not shown) may then be placed over the pattern previously formed to produce a card embodying the invention. This is by way of illustration only and any suitable means for making and encoding the space between the top and bottom surfaces of the card is within the scope of the invention.

Figure 15:
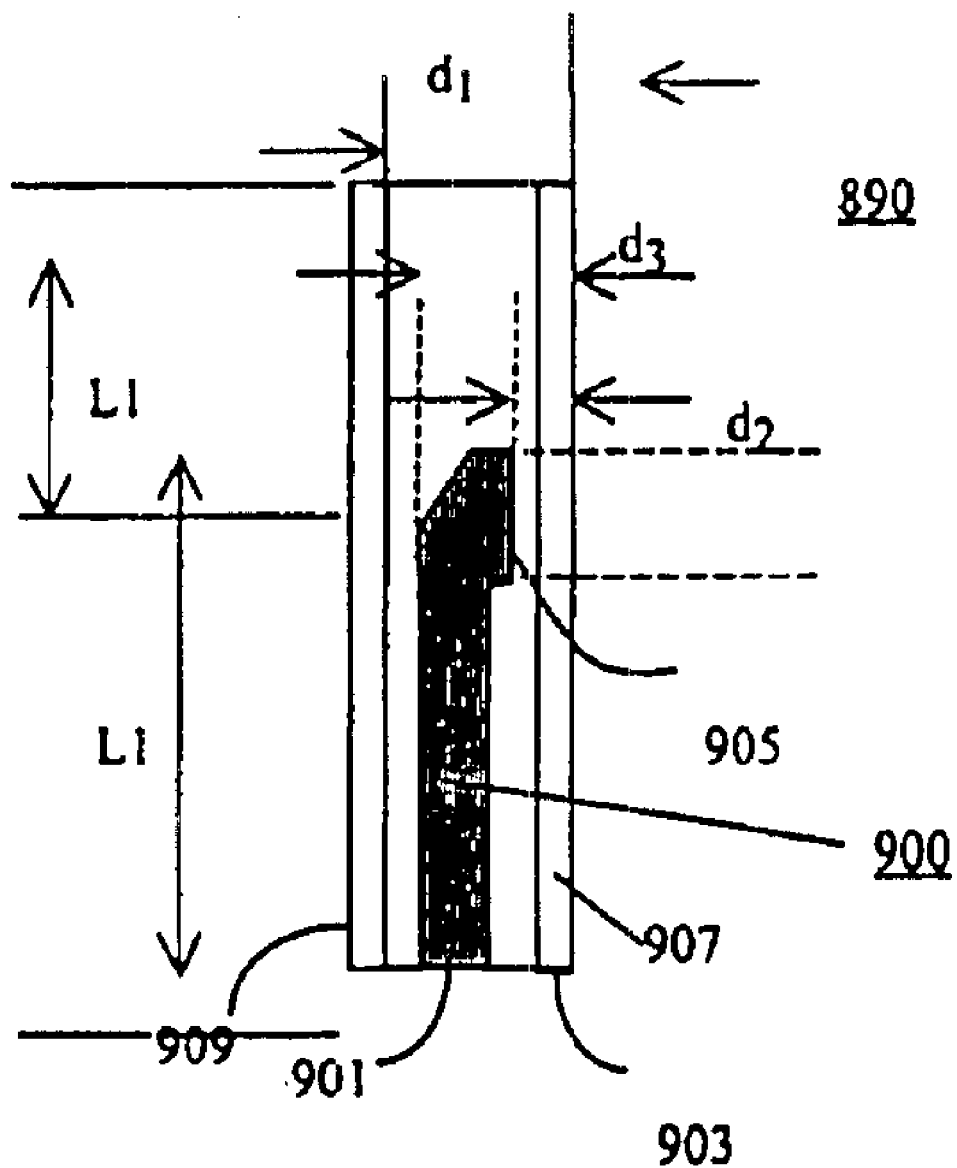
FIG. 15 is a cross-sectional view of a card containing a "hidden" light pipe.

FIG. 15 shows a cross-section of a card 890 containing "hidden" light pipe 900. The pipe is "hidden" in that while one end 901 of the light pipe terminates along one edge 903 of the card (and may be seen), the other end 905 of the light pipe terminates below the surface 907 of the card (and is therefore not readily visible). Assume, for example, that the distance, d1, between the top surface, 907, and the bottom surface, 909, of the card is equal to 30 millimeters and that the diameter of the light pipe 900 is equal to 10 millimeters. The light pipe 900 may be placed so that, for example, the end 905 of the light pipe is between 5 and 10 millimeters below the surface 907 of the card. This allows for sufficient room to bend the light pipe and to have the pipe extend down so the end 901 of the light pipe abuts the lower edge 903 of the card. Note that the "hidden" end 905 of the light pipe may be placed at any arbitrary point between lower edge 903 and the upper edge 911 of the card; i.e., the relative distances L1 and L2 shown in FIG. 15 may be varied over the full width (or length) of the card. In the side view of FIG. 15, only one light pipe is shown. It should be evident that numerous pipes may be formed between the top and bottom surfaces, as shown for example, in FIG. 17B. It should also be observed that the light pipes may terminate in an internal "hidden" region 951a.

When the card is formed with "hidden" pipes, the information pertaining to the pipes and their location may be encoded on a magnetic stripe, a bar code or a semiconductor device located on the card.

FIGS. 16A and 16B show the use of light pipes or optical fibers, 900a, having a region 951 where the surface of the light pipe or fiber is (chemically or via laser) etched to produce "pits" in the surface of the light pipe or optical fiber, 900a. The pitted regions 951 enable light to enter the pipe/fiber 900a via the region 951 and to be collected and transmitted along the pipe/fiber 900a to the other end 901 where it is emitted, as shown in FIG. 16A. Alternatively, as shown in FIG. 16B, light can enter the end 901 and be transmitted along the pipe/fiber 900a until it reaches region 951, where it is then emitted.

Figure 17B:
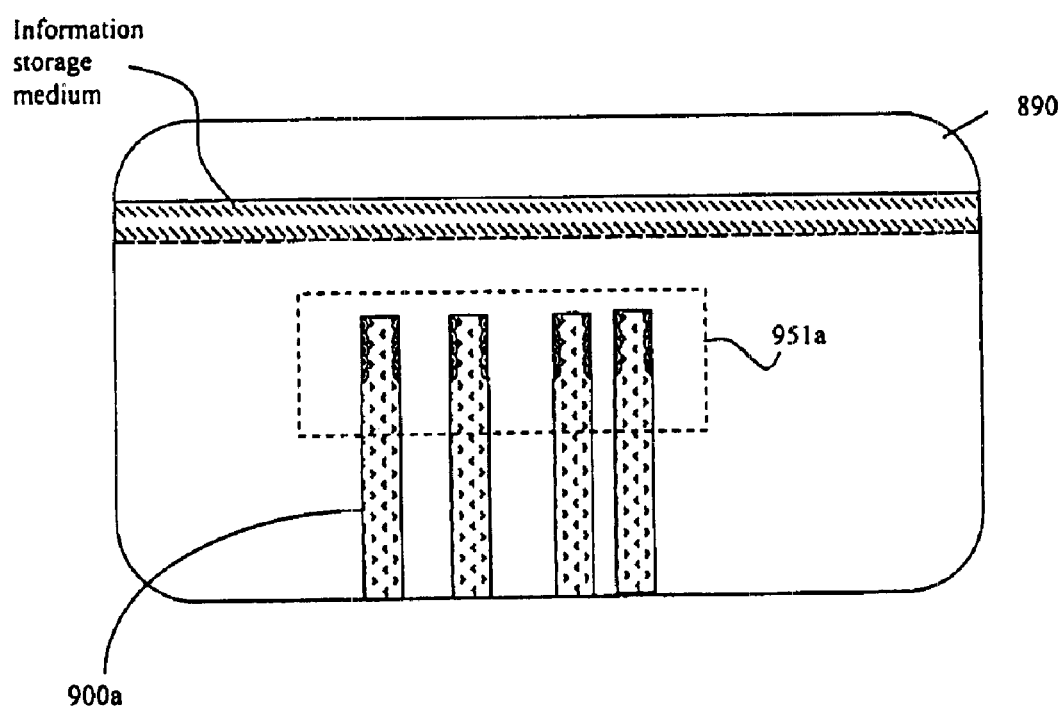
FIG. 17 is a cross-sectional view of a card with a "hidden" pitted optical fiber.

The optical fibers 900a shown in FIGS. 16A and 16B may be used to produce a card of the type shown in FIGS. 17A and 17B. FIG. 17A illustrates that an etched optical fiber 900a may be placed between the top and bottom surfaces of a card 890 so as to either receive or emit light at a point Lx along the width (or length) of the card. FIG. 17B illustrates that the etched "hidden" fibers may be used to form intricate patterns. In the manufacture of the card 890 (See FIG. 17A), one layer 907 and the adjacent region r1 may be translucent to permit light to pass through and the other layer 909 and the adjacent region r3 may be opaque to block the passage of light. Alternatively, both layers 907, 909 and both regions r1 and r3 may be translucent.

Light pipes 900a having different frequency (spectral) responses may be used and randomly or arbitrarily disposed within the card to produce a random or arbitrary response. Alternatively, the light pipes 900a having different responses may be used and disposed within the card in a predetermined and or programmed manner to produce a predetermined response.

When a card is formed the resulting pattern may be sensed and corresponding data may then be recorded on an information storage medium located on the card. The recording may then be either:

(a) encoded on the card [e.g.,by means of a magnetic stripe, a bar code, or an integrated circuit (IC) formed on the card or by any other suitable means]; or (b) fed into a computer where the information for subsequent comparison with the card is used and read at some later time.

Figure 18A:
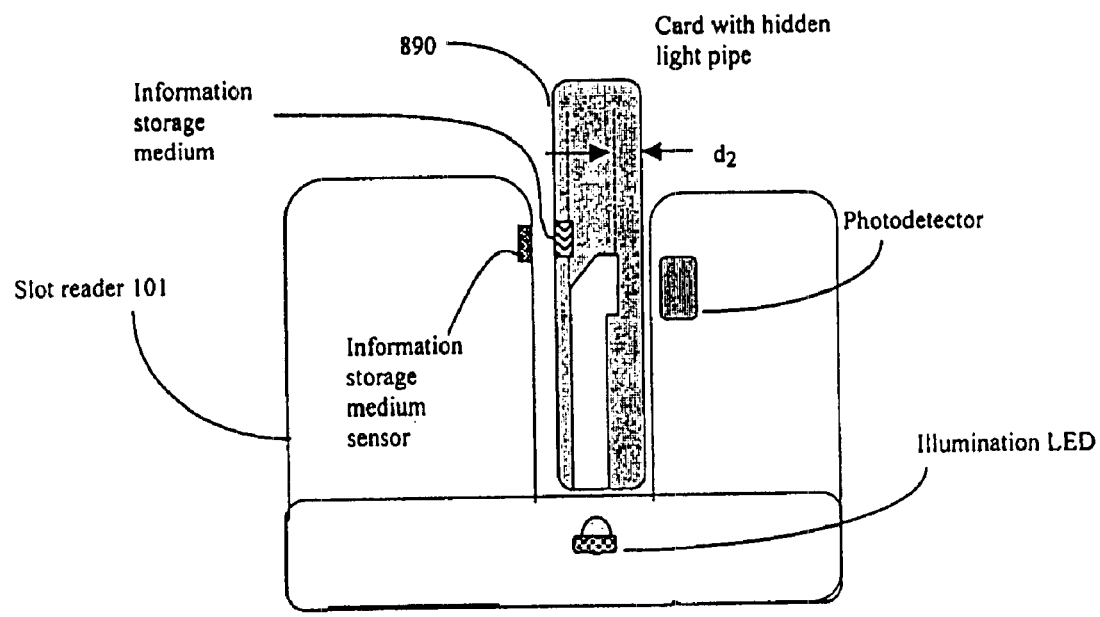
FIGS. 18A and 18B are cross sectional views of a slot reader for reading cards embodying the invention.
Figure 18B:
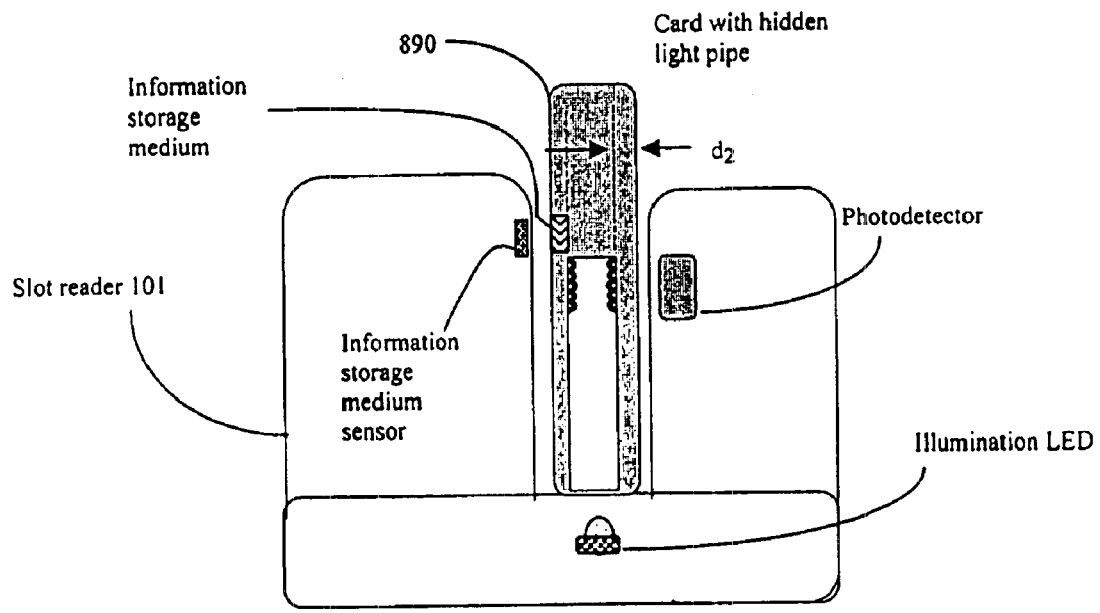

As shown in FIGS. 18A and 18B, a card 890 formed with a plurality of "hidden" light pipes, with the information pertaining, to the pipes being encoded on the card, may be inserted in a slot reader 101. The reader includes means for sensing the optical pattern and may also include a sensor to sense the data in the information storage medium pertaining to the pattern. The reader 101 compares the two readings to determine the validity of the card.

Figure 19A:
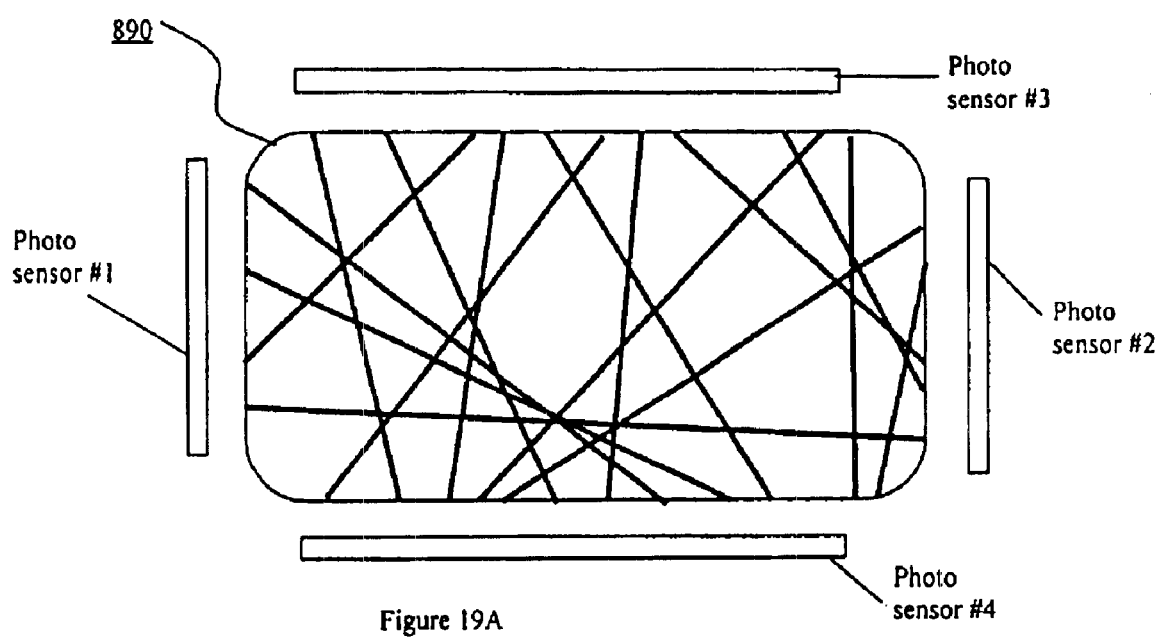
FIGS. 19A and 19B are, respectively, a top view and a cross-sectional view of a card with randomly placed optical fibers in accordance with the invention.
Figure 19B:
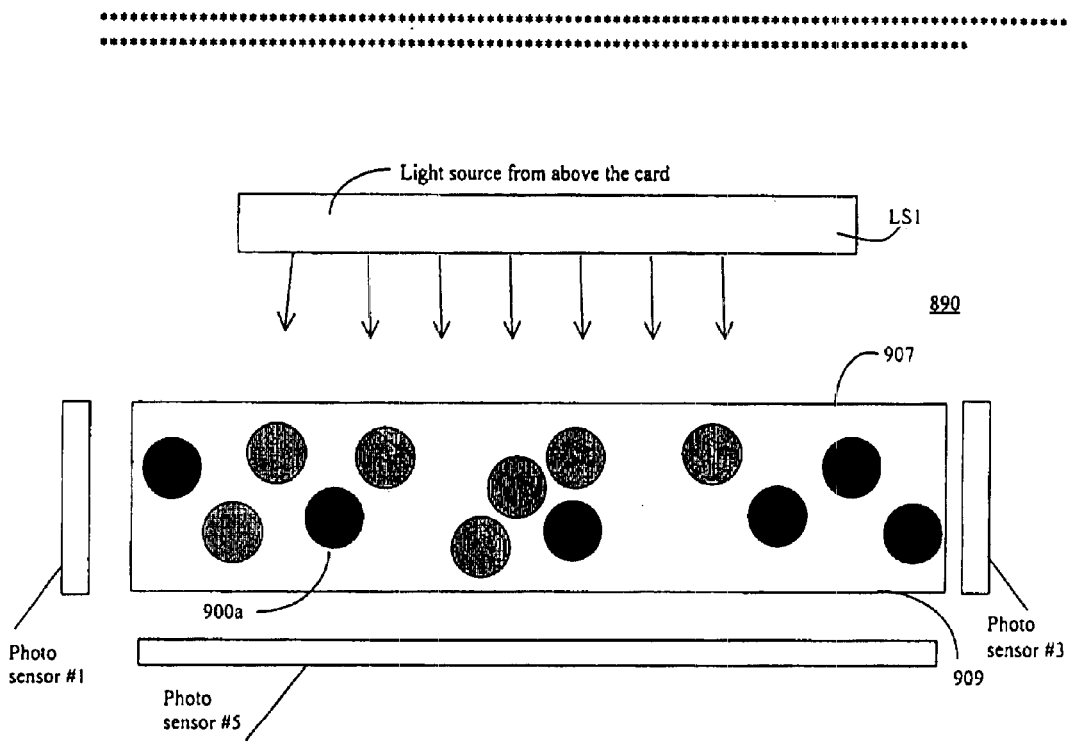

There may be more than one layer of light pipes between the top and bottom surfaces of the card. In FIG. 19A, different light pipes are distributed randomly or arbitrarily at numerous different angles to produce numerous different cards. FIG. 19A is a top view of optic fibers or light pipes randomly placed between the top and bottom surfaces of a card 890,with the optic fibers extending between two edges of the card. FIG. 19B shows that various layers of randomly placed optical fibers/pipes can be placed between the top and bottom surfaces of the card. Each fiber/pipe (900,900a) extends between two edges of the card. Where the thickness of the card is two or three times the diameter of the optic fibers two or three layers of optic fibers can be randomly placed between the top and bottom surfaces of the card. The pattern created by the randomly placed optic fibers/pipes can be sensed in several ways as follows:

1—One side of the card can be illuminated (e.g., via light source LS1 in FIG. 19B) and (a) the light emanating from any of the other three sides of the card can be sensed by means of photosensors (1,2,3,4,5 in FIGS. 19A and 19B) located opposite any of the three sides; and/or (b) the light emanating from the top and bottom surfaces of the card can be sensed.

2—One of the top and bottom surfaces of the card can be illuminated and (a) the light emanating from any of the four sides of the card can be sensed; and/or (b) the light emanating from the other one of the top and bottom surfaces can be sensed.

Sensing of the top and bottom surfaces can be accomplished by means of a linear array or an area array of photo sensors, such as a CCD array. The output pattern produced in response to an illumination signal may be similar to that shown in FIG. 10B—although the resulting pattern may be more complex than the FIG. 10B showing. The output pattern is sensed by a linear or area imaging array and the sensed signals are then processed to produce a digital or analog signal corresponding to the sensed signal(s) and to the underlying pattern. This digital or analog signal, indicative of selected characteristics of the pattern, may then be encoded and may be termed a "security code" which may be stored on the card or in a central computer. The security code may be stored on the card by imparting the corresponding information on a magnetic stripe located on the card, by storing the information in a semiconductor memory chip located on the card, by writing a bar code onto the card at a predetermined location, or by any other similar means for storing data. Subsequently, when the card is about to be used, the card is illuminated and the security code is read and compared with the light pattern output. Then, if there is a match the card is validated.

Instead of storing the security code on the card, the security code may be stored in a central computer which is accessed each time the card is about to be used. That is, when the card is about to be used, the card is illuminated and the light signals are sensed. These signals are then compared with the security code corresponding to the card which is stored in the computer. If the data checks out the card is validated.

Each card formed as illustrated in FIG. 19A is formed in a truly random manner and is therefore unique. This makes it nearly impossible for forgers to copy and/or falsify these cards.

As shown in FIGS. 18A, 18B, 19A, and 19B, either "pitted" optical fibers 900a and/or "non-pitted" optical fibers 900 may be used to form random arrangements in accordance with the invention.

As noted above, the inventive concepts described for impeding the counterfeiting of cards, instruments, and documents are also applicable to systems for impeding the counterfeiting of optical data storage discs. Optical data storage discs include compact discs (CD's) which provide, among others, a read-only-memory (ROM) function. The optical data storage disc includes a layer of transparent material formed over one side of the disc with a pattern of indentations defining digital data. This one side of the disc may be covered with a thin coating of reflective material. The digital data is then optically read in any suitable manner (e.g., from the opposite side of the disc).

There is a significant problem associated with the counterfeiting of the information contained on discs, whether the information is in the form of digital data, applications programs, music, etc. A counterfeiter can replicate any existing CD and sell the CD containing the information for 10%, or even less, of the retail price. This sharply cuts into the profits of the legitimate suppliers of the disc.

Applicants' invention is directed to forming security features on a CD and encoding these features on the CD so that these features can be crosschecked to validate the CD. This is best explained with reference to FIG. 20A.

Figure 20A:
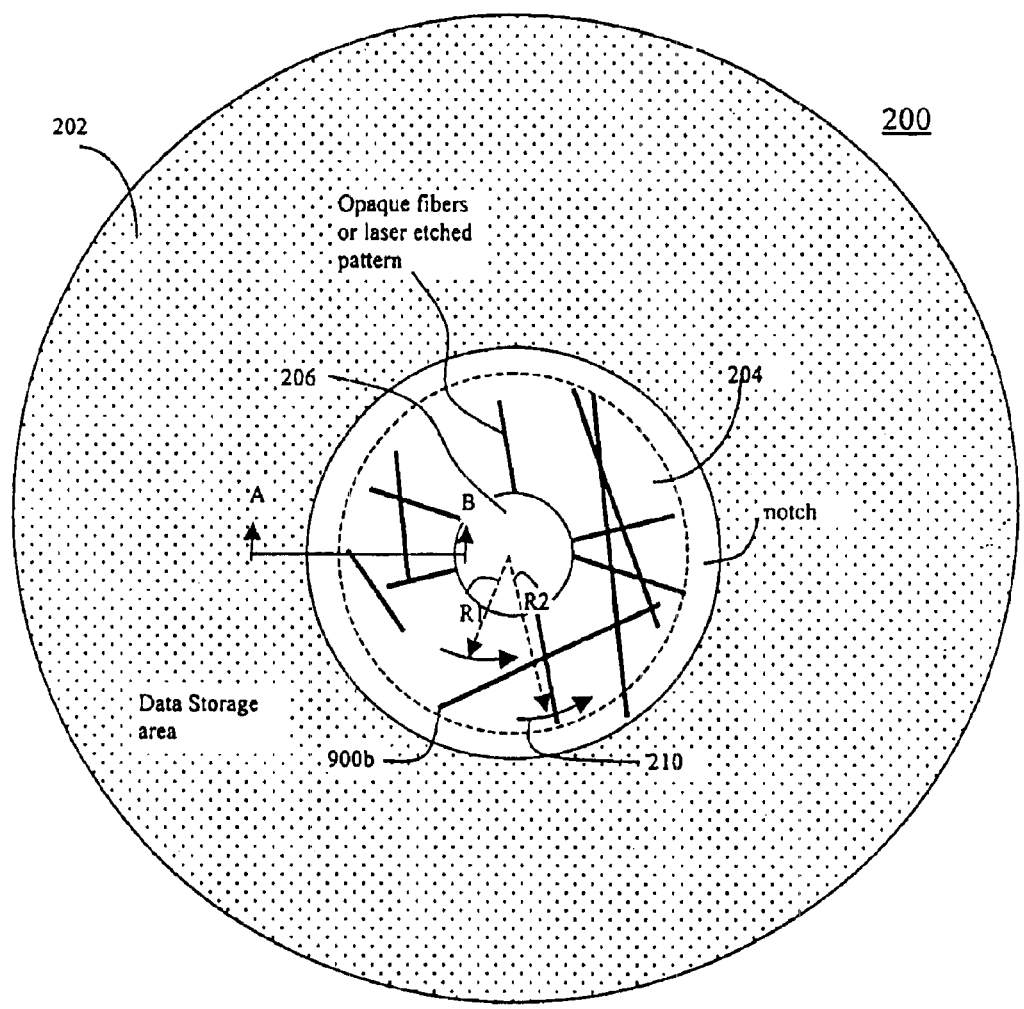
FIG. 20A is a top view of a compact disc (CD) embodying the invention.

FIG. 20A is a top view of a CD ROM 200 having an outer annular region 202 for the storage of information, an inner annular region 204, closer to the center of the disc, and a center region 206 which normally contains an opening such as a hole. The inner region 204 is normally blank and may be translucent.

In accordance with one aspect of the invention, hair like opaque strands 900b may be formed within region 204. These optical strands may be optical fibers of different colors for providing different spectral responses (or other suitable light pipes). The strands 900b may be formed, or placed, within the annular region 204 such that they either: (a) lie horizontally between the top and bottom surfaces of the disc, or along a disc surface, parallel to the surface of the disc; or (b) are mounted vertically between the top and bottom surfaces of the disc.

In accordance with the invention the strands 900b may be placed and positioned within translucent region 204 in several ways, some of which are as follows:

(a) randomly formed or placed within the region 204; or
(b) arranged within the region 204 in an arbitrary and/or programmed manner to produce a unique or predetermined pattern.

In accordance with another aspect of the invention, a plurality of marks, also identified by the reference numeral 900b, may be etched, scribed or burned (e.g., chemically or via a laser) into region 204. These marks 900b may be formed in a random manner or they may be formed arbitrarily, or in accordance with some program. Thus, the CD ROM may be formed with a unique pattern located within the translucent region 204 with either laser etching or by embedding opaque fibers. A large number of different patterns can be generated in this manner. Also, the pattern may be formed at the formation of the CD ROM.

Figure 20B:
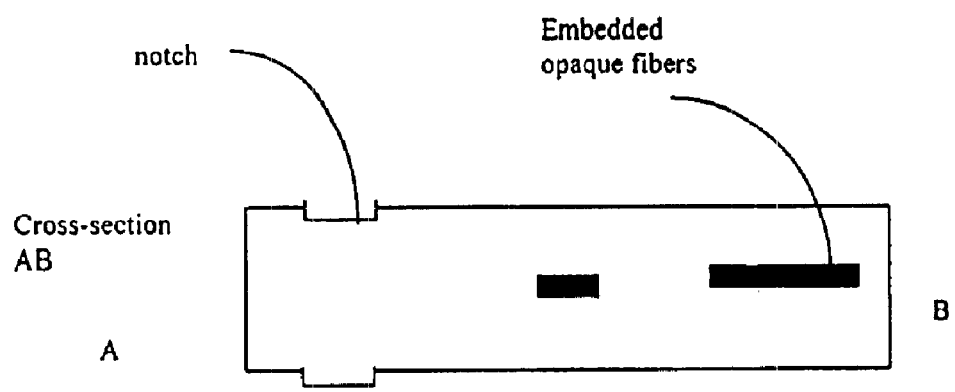
FIG. 20B is a cross-sectional drawing of part of CDROM in FIG. 20A when opaque fibers are embedded in region 204.
Figure 20C:
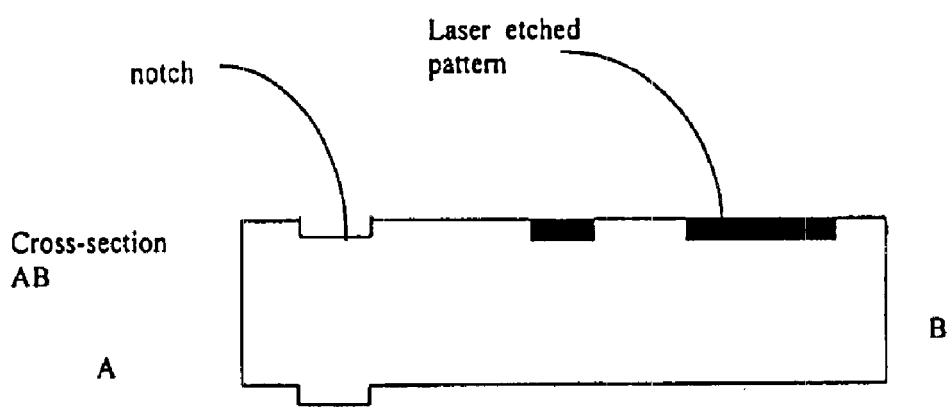
FIG. 20C is a cross-sectional drawing of part of CDROM in FIG. 20A when "marks" are laser etched on the surface in region 204.
Figure 21:
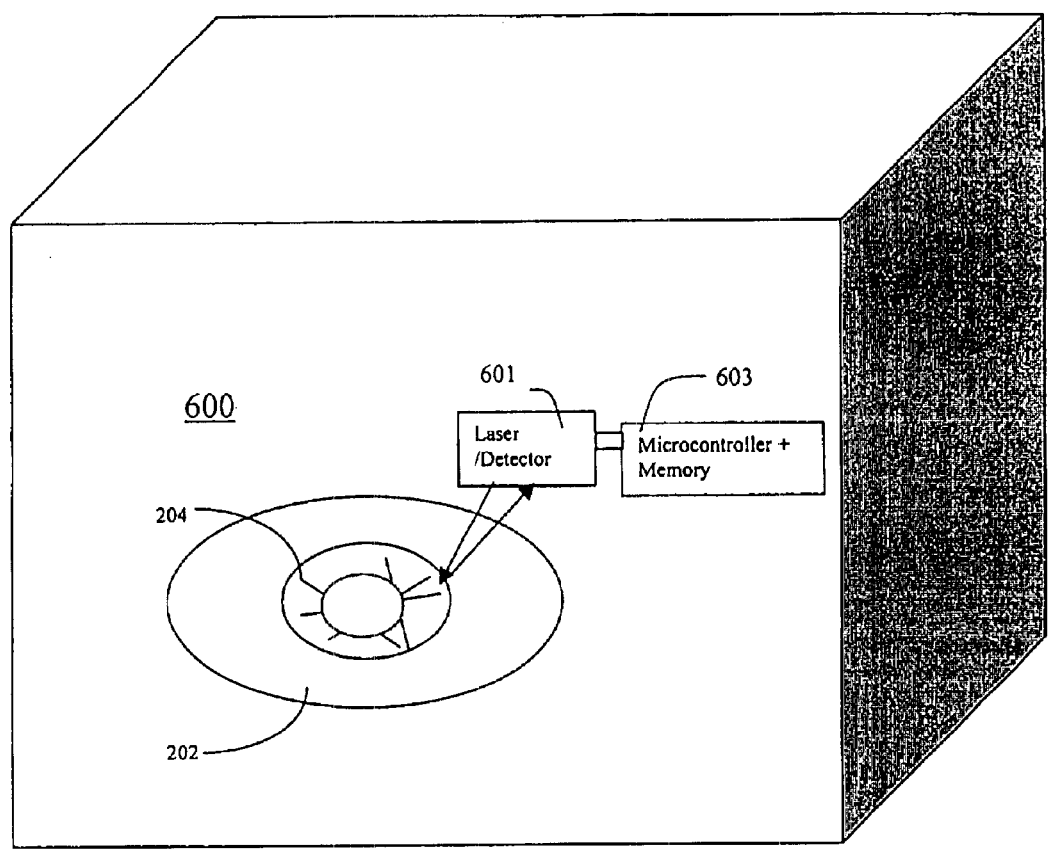
FIG. 21 is a highly simplified diagram of a reader/writer for use with disc's embodying the invention.

As a finishing step in the manufacture of the CD, the CD may be placed in a CD reader/writer 600 as shown in FIG. 21. The signal or spectral pattern resulting from illuminating the optical strand pattern (see FIG. 20B) or the optical marks pattern (see FIG. 20C) in region 204 may be read. FIG. 21 shows a laser/detector 601 which can illuminate the disc and the detect light reflected form the disc. It should be appreciated that when the CD is being read that the reader 600 may be programmed to read only a certain section or sector of the disc (e.g., region 210 in FIG. 20A) and to record pattern information for that sector. Alternatively, the reader 600 may be programmed to scan the pattern sensed along a radius R1 or a radius R2 as shown in FIG. 20A. The signals corresponding to the pattern read are then encoded within a specified area of region 202. Note that this permits the pattern formed on one disc to be made the same as the one formed on another disc. But, by programming the reading of different sections (e.g., by scanning along different radii, R1, R2) of the discs provide a different code to be stored and to be searched for. Interestingly, even if two optical patterns formed on two different discs are the same, by programming the scanning of the disc at different radii makes the generation of the security code virtually unique even for apparently like optical patters. At each different radius there is formed a unique pattern. This pattern may then be used to generate a "unique security code" for the CD ROM. The corresponding information is then encoded and written onto the CD ROM as a hidden file. The information stored in the hidden file is related to the specific radius of the scan and the particular pattern scanned at the programmed radius.

By way of example, as a CD spins within the CD reader/writer 600, a laser photo detector 601 scans the translucent region 204. The laser scanner 601 and associated signal processing circuitry 603 calculate a "security code" (i.e., the "fingerprint") associated with the pattern read and determines the "fingerprint" placed on the disc. The "fingerprint" parameter is then written onto the CD, preferably in region 202, as an "hidden" file.

Subsequently when the CD is loaded into an appropriate reading device, the device reads the "hidden" file in region 202. The device can then read (sense) the pattern in region 204 and verify whether the pattern it reads matches the "fingerprint" parameter stored in the hidden file. The pattern formed in region 204 of the disc may be read by the same laser/photodetector circuitry that is used for reading the CD ROM information in region 202. A requirement is that the laser/photodetector be able to scan the region 204 as well as the region 202. If the two regions can not be read with a single laser, then existing equipment would be modified to provide a second laser/photodetector arrangement to scan both regions 202 and 204. When a CD ROM is placed into a reader one of the first steps in validating the CD ROM is to verify whether the security code stored in the hidden file is consistent with the scanned pattern at the programmed scan radius. The validation step may be programmed into the disc or into a reader (e.g. 600) or a combination of both.

I—CD/DVD WITH Hologram/OVD

Figure 22:
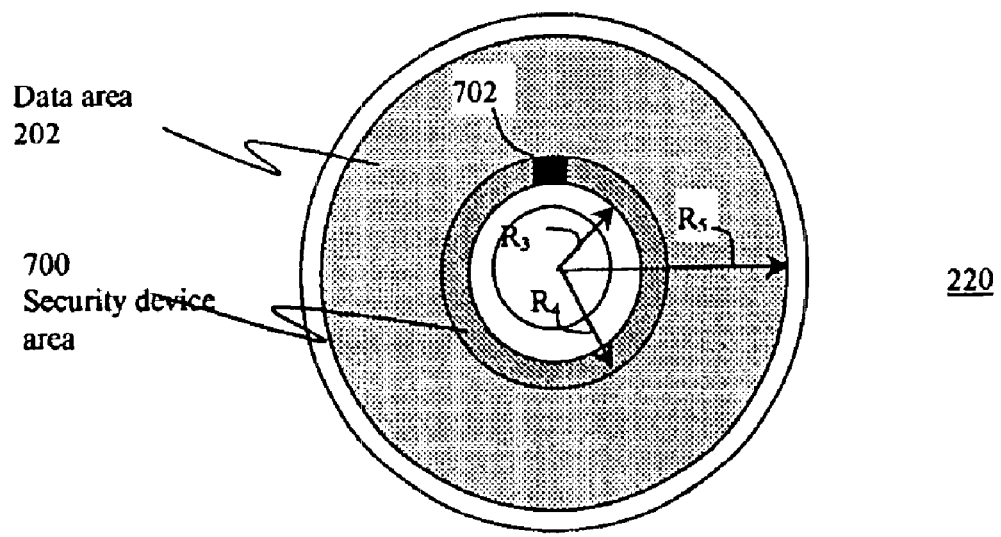
FIG. 22 is a simplified diagram of a disc with a security device attached in accordance with the invention.
Figure 23:
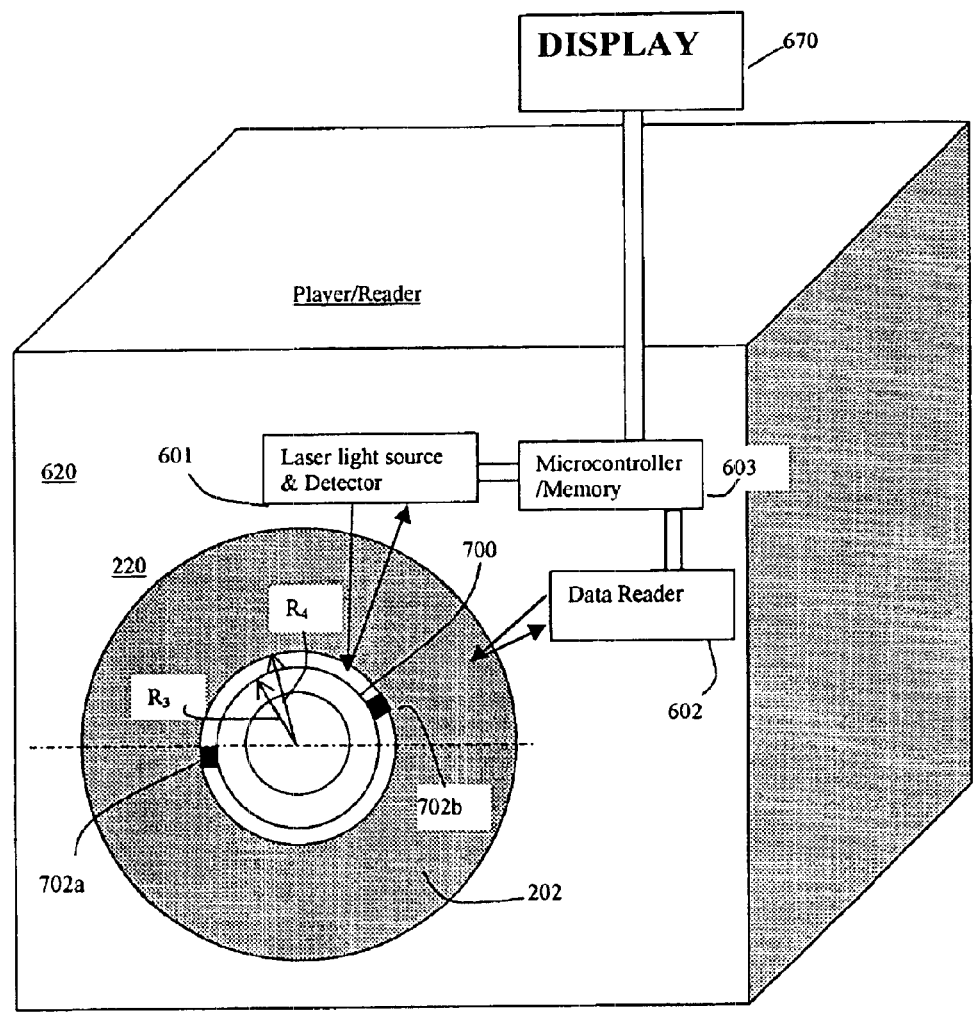
FIG. 23 is a simplified drawing of a reader/player embodying the invention for reading a disc containing security device(s) in accordance with the invention.

According to one aspect of the invention, as shown in FIG. 22, a security device (e.g., a hologram or an OVD) is embedded on or within a disc 220, where the disc may be a CD or a DVD or any like device. The disc 220 may be inserted into a player/reader 620, as shown in FIG. 23, programmed to sense and recognize the presence of embedded security device(s) located on or within the disc. If the player/reader 620 senses and recognizes the presence of the security device(s), it is programmed to then read and display the data contained on the disc. The disc 220 includes an annular ring 700 lying between a radius R3 and a radius R4 which defines a security region in which security devices (e.g., a hologram or an OVD) may be placed; note that R4 is selected to be sufficiently greater than R3 to provide sufficient space for the placement of security devices. FIG. 22 shows a machine readable hologram 702 attached to the disc 220 within the annular ring 700, which defines a security area. In FIG. 22, the annular region between radius R4 and radius R5, where R5 is greater than R4 and R5 borders the outer edge of the disc, is the data area 202 and generally contains the intellectual property (IP) being distributed to rightful purchasers and which is meant to be read and/or displayed by the rightful users. The disc 220 is shown with a central circular region of radius R3 in which there are no security devices. However, it should be understood that this region may also be used for the placement of security devices.

Figure 22A:
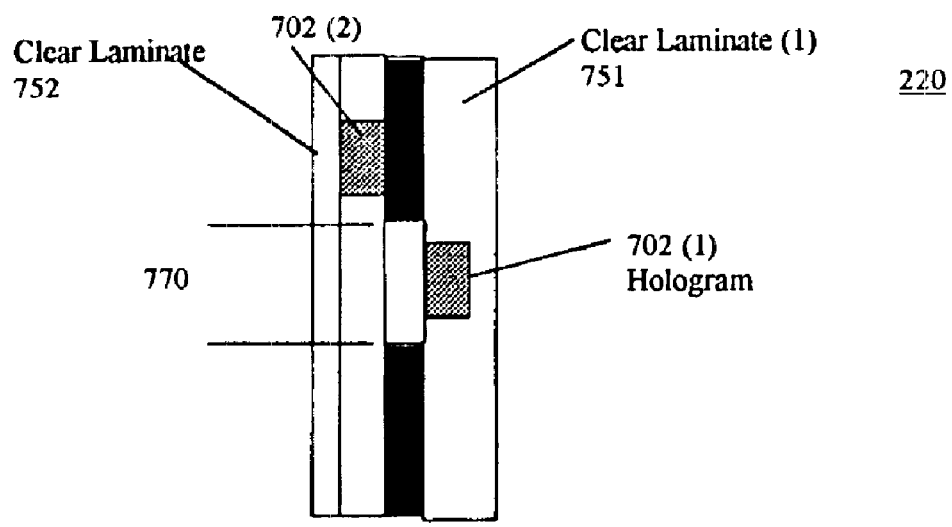
FIG. 22A illustrates alternative placement of security device on or within a CD.

FIG. 22A shows a CD disc 220 with a clear laminate layer 751 on one side of the disc and another clear laminate layer 752 on the other side of the disc. The laminate layers function to protect the disc and any security device located on or within the disc. A security device [e.g., hologram 702(1)] may be located within a translucent region 770 and may be sensed/read with sensors located on either side of the disc. Another security device [e.g., hologram 702(2)] may be located along an opaque region between clear laminate 752 and the disc, can only be read by a sensor facing the clear laminate 752. Thus, a security device may be attached to different parts of the disc and will normally be covered by a laminate layer which tends to protect the contents of the disc and the security device. Note also that the security devices are shown in a security region separated and apart from the data region; however the security devices may also be located within the data region.

Figure 23A:
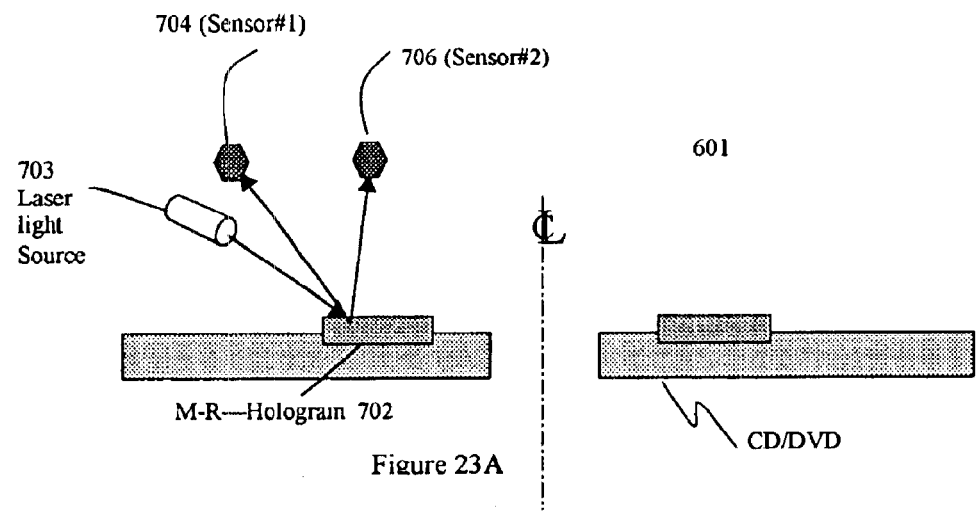
FIGS. 23A and 23B are diagrams illustrating the use of different light sources and sensors to sense security devices placed on or within a disc in accordance with the invention.
Figure 23B:
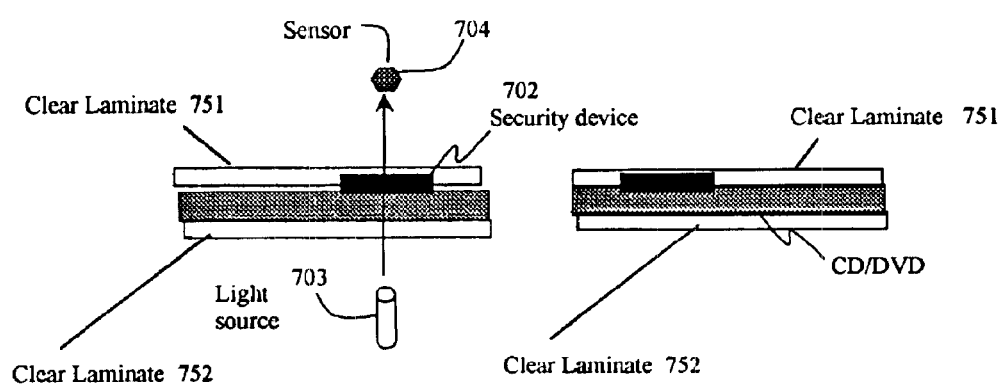

It is intended that purchasers and users of discs 220, made in accordance with the invention, "play" or use the discs by placing them in a player/reader 620, embodying the invention, which may include features of the type shown in FIG. 23. The player/reader 620 may include one or more sensors for sensing the contents and/or the position of a security device on a disc. Where, for example, the security device is a hologram, the player/reader 620 includes a laser light source and detector apparatus 601 for reading and sensing the presence and/or contents of hologram 702 on disc 220 in addition to data reader circuitry 602 for reading the contents of data section 202 of disc 220. FIG. 23A shows that apparatus 601 may include a laser light source 703 and sensors (704, 706) for reading a machine readable (M-R) hologram 702 and the data contained on the disc 220. In FIG. 23A the light source and the sensors are located above the disc with the light reflected from the disc and the security devices being sensed by the sensors. FIG. 23B shows that, where the annular ring 700 is transparent to the light source 703, a light source 703 may be placed on one side (below) the disc and the sensor(s) may be placed on the other side of the disc in order to sense the light passing through a security device 702 attached to the disc.

Description of Player/Reader

The optical sensors (704, 706) shown in FIGS. 23A and 23B may be located within a player/reader 620 (see FIG. 23). The configuration of FIG. 23A may be used in connection with a machine readable hologram 702 which may contain a hidden code. The apparatus and circuitry to sense and read the holograms may be similar to the circuitry shown and taught in our earlier filed U.S. Patent Applications entitled Multi Sensor Reader bearing Ser. No. 09/056, 134 filed Apr. 17, 1998 and in our like titled continuation-in-part application bearing Ser. No. 09/834,224 filed Apr. 26, 2001, the teachings of which are incorporated herein by reference. The first sensor 704 may be used to detect the reflected energy from the hologram and the second sensor 706 may be used to detect the remaining energy reflected from the mirror-like surface of the hologram. If the phase angle of the signals sensed by the two sensors are not in phase then the hologram passes one of the security checks that is needed to determine whether the CD/DVD is a valid device. If the signals are in phase it is an indication that the hologram (702) has been counterfeited and that the CD/DVD is not a valid device.

Referring to FIG. 23, the reader/player 620 includes a micro-controller/memory section 603 which is programmed to sense the hidden code (security information). The security information can be read as the disc rotates or when the disc is in a rest position. When security information is sensed by detector circuitry 601, it is supplied to the micro-controller 603 which is programmed to evaluate whether the security information conforms to predetermined standards. After the disc is validated by the reader 620, as programmed, the reader 620 allows the IP contents of the disc in data area 202 to be read by means of a data reader 602 and to be supplied to a display element 670 to be displayed/used. [Note: the micro-controller/memory/comparator 603 and 603a referred to herein and shown in the appended drawings, includes known microprocessing and data storing capability for processing and handling the data associated with the system.] Therefore a reader/player of the type shown in FIG. 23 can sense security information on a hologram 702 located within an annular ring 700 on disc 220. Positioning the security device (e.g., 702) within a predetermined annular ring (e.g., 700) allows the laser light source and the sensors to be stationary relative to a fixed radius. A pirate or counterfeiter of a disc must therefore be able to duplicate the security device and place it in such a manner on a counterfeit disc that the disc appears as a valid disc to the player/reader 620. Note that FIGS. 23A and 23B show one light source, but it should be understood that more than one light source may be used to illuminate the data region and the security region.

II—CD/DVD WITH Hologram/OVD whose Contents are Written Back onto CD/DVD

Figure 24:
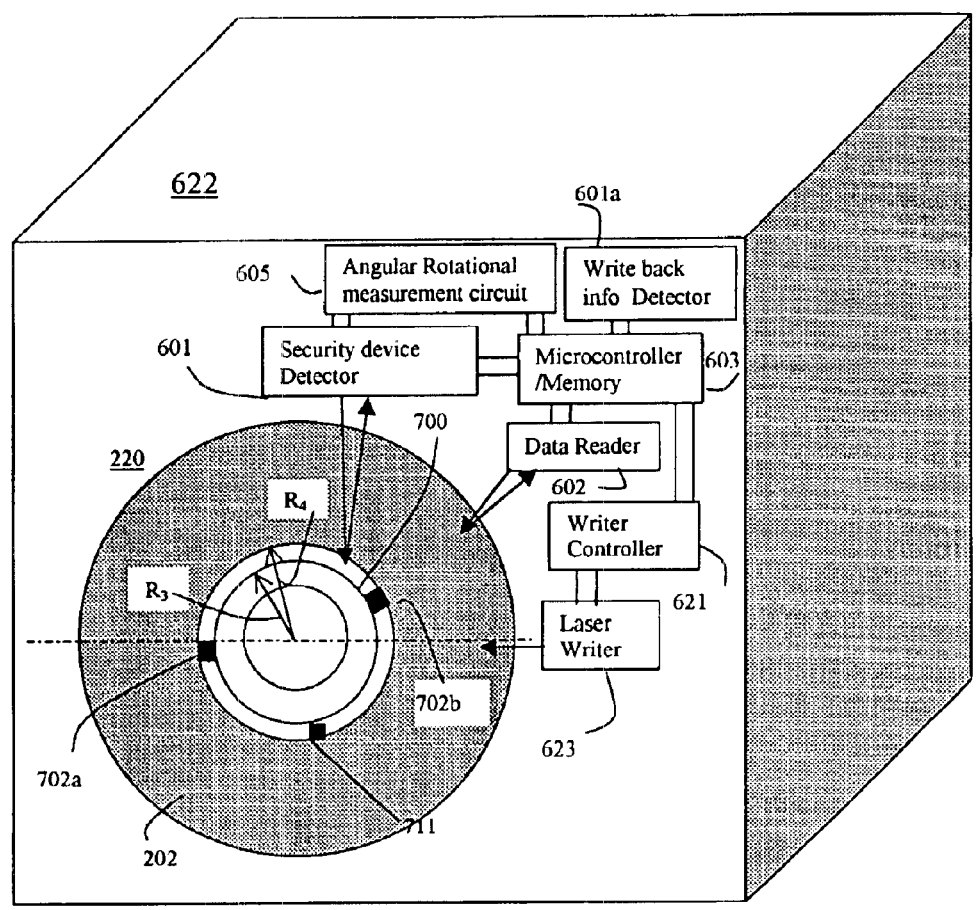
FIG. 24 is a simplified representative diagram of an encrypting machine embodying the invention for sensing the presence of certain security devices on a disc and then encoding the disc.

In accordance with the invention, a disc 220 with a security device (e.g., 702) embedded on, or within, the disc, as discussed above, may be inserted in an encrypting (authenticating or validating) machine 622, shown in FIG. 24, which is programmed to read/sense security information (i.e., presence of security devices and/or their contents). The machine 622 is further programmed to annotate (i.e., write-back on) the disc 220 and/or the security device with signals corresponding to the sensed security information. In systems embodying the invention, purchasers and users of these annotated discs need to play them in player/readers which include means for reading the security information and the annotated information and to compare the two to ensure that the disc being read is not a counterfeit. FIG. 24 illustrates that a disc 220 with machine readable holograms 702a, 702b may be inserted in encrypting apparatus 622. Machine 622 includes a security device detector 601 (which may be comparable to laser light source and detecting circuitry 601 of FIG. 23) for selectively sensing the contents and/or the position of holograms 702a, 702b. Machine 622 further includes micro-controller and memory circuitry 603 which is: (a) responsive to sensed security information; (b) programmed to process the sensed security information; and (c) programmed to produce signals corresponding thereto and to supply these signals to a writer controller 621. In FIG. 24, the writer controller 621 then controls a laser writer 623 which functions to "write-back" information corresponding to the sensed security information onto the disc 220. The write-back information may be encoded (written back) in a hidden file within the data region 202 (or any other suitable region of the disc including one or more of the holograms). By way of example, where the security device is a hologram, information derived from the hologram is used by encrypting apparatus 622 to annotate the disc in the data region (or in any other suitable site) with security information derived from the hologram. The encrypting apparatus may also include a write-back info detector 601 a to sense the nature of any security information previously written back and/or being written onto the disc 220. The apparatus of FIG. 24 may also include angular rotational measurement circuitry 605 which may receive inputs from security device detector 601 or which may include its own sensors to sense the position(s) of security devices located on the disc. The information received and processed by circuitry 605 is then supplied to controller circuit 603 for additional processing. The additional processing results in information used to drive writer controller 621 and laser writer 623 to encode security information on disc 220. A data reader 602 is included to read the IP data as well as any security data in region 202.

The disc 220 shown in FIG. 24 includes two different security devices (702a, 702b) located along the annular ring 700 and a reference (set) mark 711 which may be used as a reference point about which the security devices may be identified. As further detailed below the security devices may be randomly placed on the disc or they may be placed in accordance with some predetermined pattern. The system includes circuitry for sensing the location of the security devices relative to the reference mark 711 and/or relative to each other. This information (which may be in polar coordinates) may provide an additional level of (unique) security information.

Figure 24A:
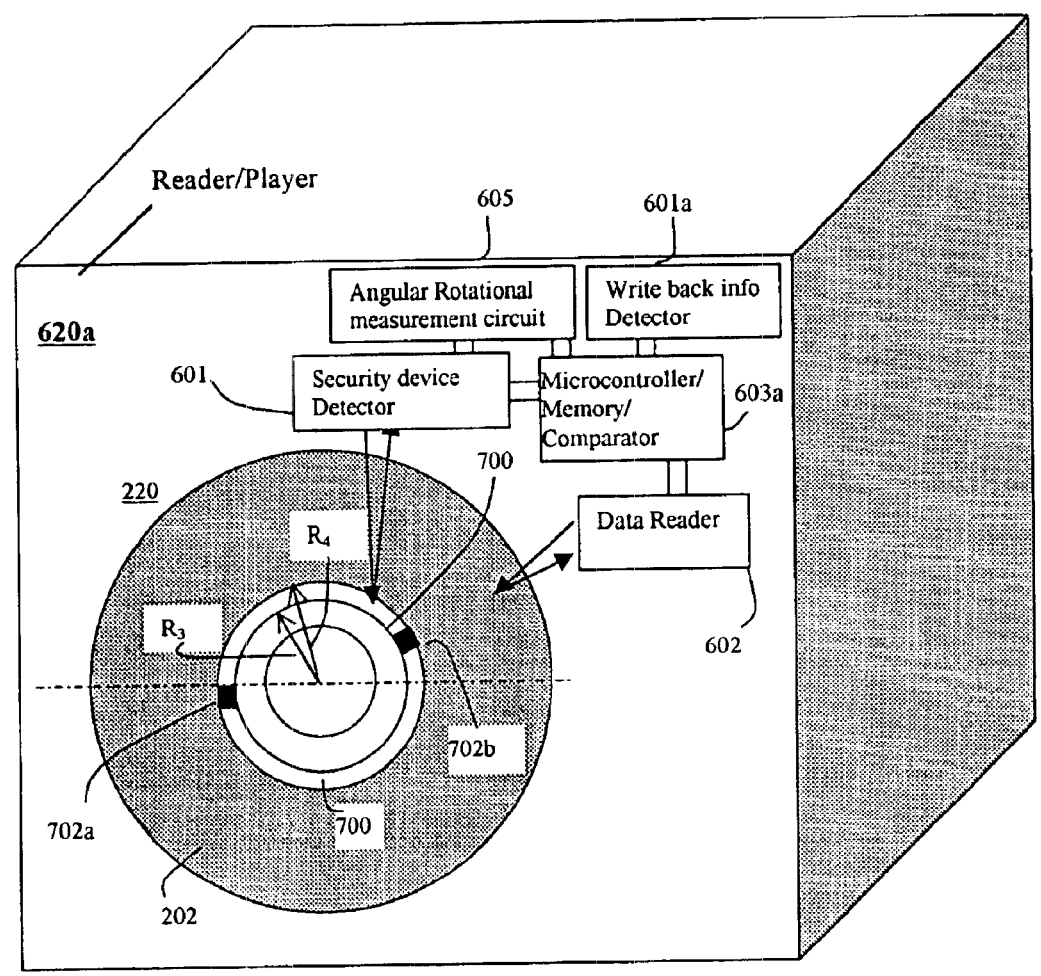
FIG. 24A is a simplified representative diagram of a reader/player for sensing/reading a disc containing a security device and corresponding security information encrypted on the disc.

In systems embodying the invention, discs with security information written back onto the disc may be placed in a player/reader which may be of the type 620a shown in FIG. 24A. The player/reader 620a includes a security device detector 601 which may be comparable to detector circuit 601 of player/reader 620 and which is programmed to sense the presence and/or characteristics of security devices (e.g., holograms). In addition, player/reader 620a includes: (a) data reader circuitry and apparatus 601a which is programmed to read the section of the disc 220 containing security information which has been written back onto the disc and which may be located in a hidden file in data section 202 or the security devices themselves; and (b) microcontroller memory comparator circuitry 603a for comparing security information written back with signals indicative of the presence of the security device.

Thus, a reader/player made in accordance with the invention includes means for sensing/reading the presence of a security device embedded on a disc (or within an annular region of the disc) and also includes means for sensing/reading any other security information previously encoded and/or written back onto the disc and means for comparing stored security information versus sensed security information before validating the disc. Once the player/reader senses the information pertaining to the security device on the disc and security information stored on the disc and after comparing and processing the information and ascertaining that the disc is valid, it allows data information in region 202 to be read and displayed.

III—DVD WITH Hologram/OVD

Another aspect of the invention applicable to DVD discs may be better explained with reference to FIGS. 25, 25A, 25B and 25C. Typically, DVDs may be described as being made up of two separate "platters" (platter or side A, platter or side B), with each platter having an external surface or side (250a, 250b) on which information (data) to be read is imprinted and an internal surface 251a, 251b. The two internal surfaces are normally attached (e.g., bonded) to each other and can not be normally separated without destroying the disc. Thus each DVD disc has two external surfaces or sides (250a, 250b) containing data to be read.

As shown in FIGS. 25, 25A, 25B and 25C (which are not drawn to scale) each DVD disc has a central region 706 which may (or may not) be translucent and which extends from the center of the disc to a radius R3. The central region is surrounded by an annular region 700, which in turn is surrounded by an outer annular region 202. In accordance with one aspect of the invention security devices (e.g., 702a, b, c, d) may be located on or along the internal side (251a, 251b) of each DVD disc and preferably (but not necessarily) within the annular region (700a, 700b). The IP data information is imprinted on the external side (205a, 205b) of each platter within the annular data region 202 which extends, generally, between radius R4 and radius R5.

In accordance with the invention, the counterfeiting of DVDs may be impeded by embedding security devices (e.g., a hidden machine readable or machine-readable microprinted hologram, an OVD, an RFID chip, or some laser etched mark or injection molded marks) on or within each DVD. During the course of manufacturing the platters, one or more of the aforementioned security devices may be randomly placed on the internal side of each platter. Then two platters are bonded together to form a complete DVD. That is, the internal sides 251a, 251b will then be bonded together with the security features firmly attached between the two sides. The security devices may be sensed (read) from the same side as the data or from the opposite side, depending on the transparency of the disc. In accordance with an aspect of the invention, a multiplicity of different security device(s) may be randomly located on or within a DVD. Although randomly placed, their position relative to each other may be measured accurately, thereby permiting the introduction of an additional and unique security feature.

Figure 25:
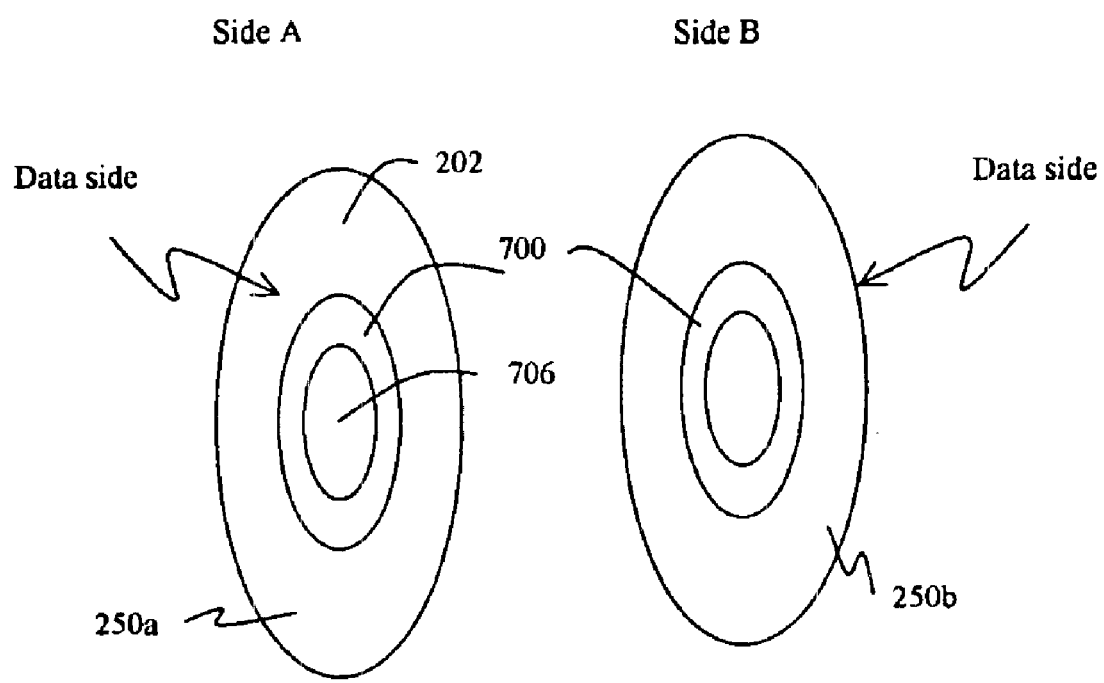
FIG. 25 is a simplified drawing of two platters (sides) forming a DVD.
Figure 25C:
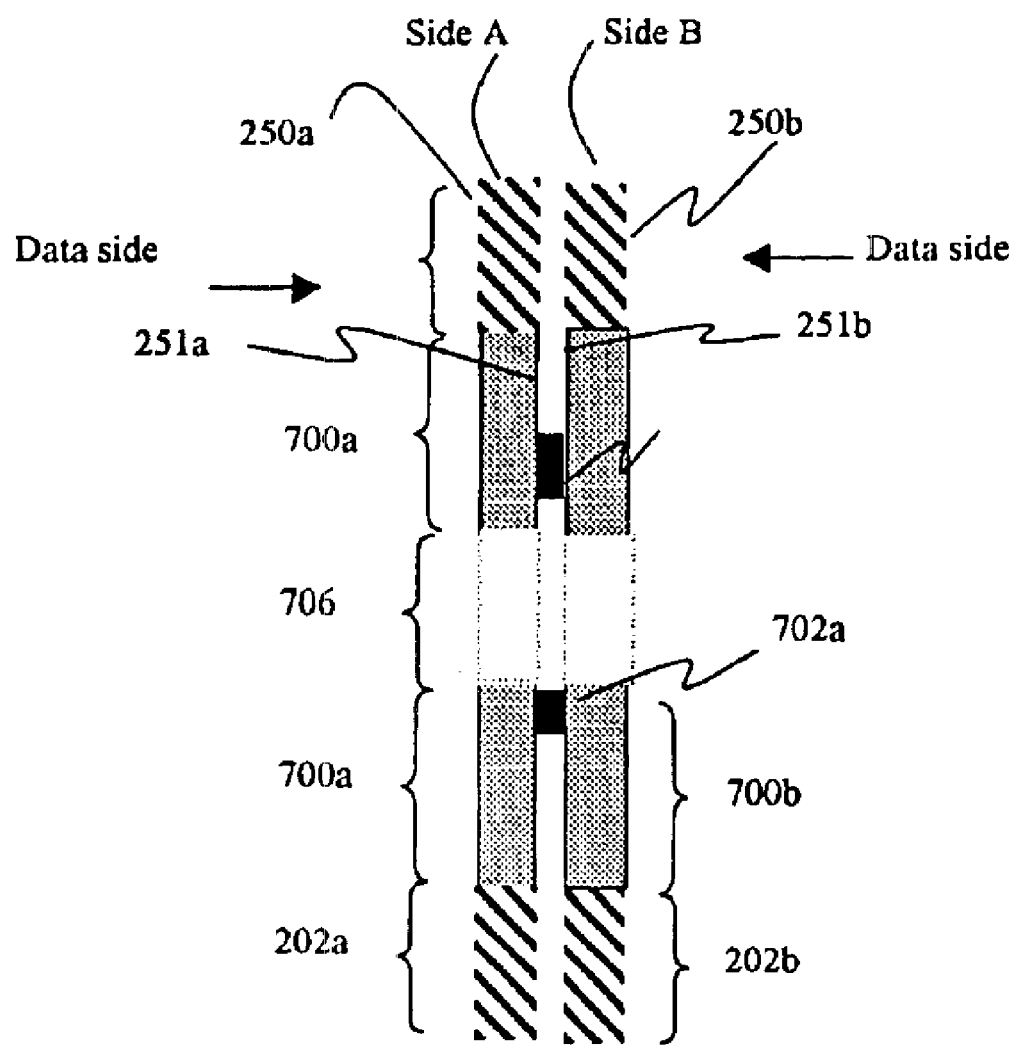
FIG. 25C is a simplified drawing of the two sides of a DVD attached to each other.

DVD with Several Security Devices:

FIGS. 25A, 25B and 25C show configurations in which several security devices are positioned within an annular ring on the DVD (700a, 700b). The security devices (not shown to scale) may be laminated to the inside surfaces of the DVD and the internal surfaces are subsequently bonded together with the inner layers of the DVD's close to each other. Referring to FIGS. 25A and 25B note, by way of example, that two holograms, 702a and 702b, are randomly placed on the inside surface 251a of side A of a disc and two holograms, 702c and 702d, are randomly placed on the inside surface 251b of side B of the disc. The two platters (side A and side B) are then bonded to each other to form the DVD disc.

The holograms 702a, 702b, 702c, and 702d may be randomly placed on their respective platters. Then, when the two platters are bonded to each other the four holograms (702a, b, c, d) may form a multiplicity of patterns ranging from no overlap (all 4 holograms are distinctly and separately placed) as shown in FIG. 26A to full overlap (only two holograms are shown since the two holograms from side A overlap the holograms from side B) as shown in FIG. 26B.

Assume that the disc of FIG. 26A is inserted into an encrypting machine of the type shown in FIG. 24. Assume further that machine 622 includes a hologram positional detector and circuitry 605 for sensing and identifying the starting point (and stopping point) of each hologram. The machine 622 is programmed to receive positional information and process it to produce specific data pertaining to the angular displacement (and distance) between each of the holograms. The information pertaining to the angular displacement of the holograms can be measured very accurately. Referring to FIGS. 26A1 and 26B1 note that clocking signals from an angular and rotation measurement circuit 605 in conjunction with controller 603 can be used to measure the time (t1 to t10) of a full cycle and the times (e.g., t12, t13, t14) each hologram on the disc is sensed as the disc rotates. Knowing the time(s) and the speed of rotation of the disc the relative distance (or time) between each hologram along the annular ring can be determined accurately. In addition, the contents (data 702a, data 702b, data 702c and data 702d) of the various holograms as shown in FIGS. 26A1 and 26B1 can be sensed and recorded.

Thus, information pertaining to the angular displacement of the various holograms and/or selected information contained within each hologram can be written back onto a selected region of a disc as part of its manufacturing process. Thus each disc that is manufactured would have a unique pattern and the information pertaining to the pattern would be written back onto the disc in a similar manner to that describe above.

Thus, in accordance with this aspect of the invention, during the preparation of the DVD, information pertaining to the spatial relationship between selected security devices (702a, b, c and d) on a disc may be captured and this security information (angular or displacement and/or information contained within the security device) can then be written back in a selected region (e.g., a "hidden file") on the DVD or even on selected ones of the security devices. This may be accomplished by means of encrypting apparatus (e.g., machine 622) into which the disc is placed and which can sense/read the hologram(s), selected security information on the hologram and which can sense/read the spacing/displacement between various holograms and then process the information and write back onto the disc in any selected (e.g., a hidden file) or dedicated region of the disc information corresponding to the security information. The encrypting machine (e.g., 622) can sense the security device and read data present on the security device and also measure the relative angular displacement between the security devices located on or within the layers of the disc.

The security devices 702 may be mounted on a DVD disc so as to be read from only one side or from either side; and generally one side at time. A player which can read from either side of the DVD may require a light source and sensors of the type shown in FIG. 23A to be mounted within the player on both sides of the disc.

Figure 27:
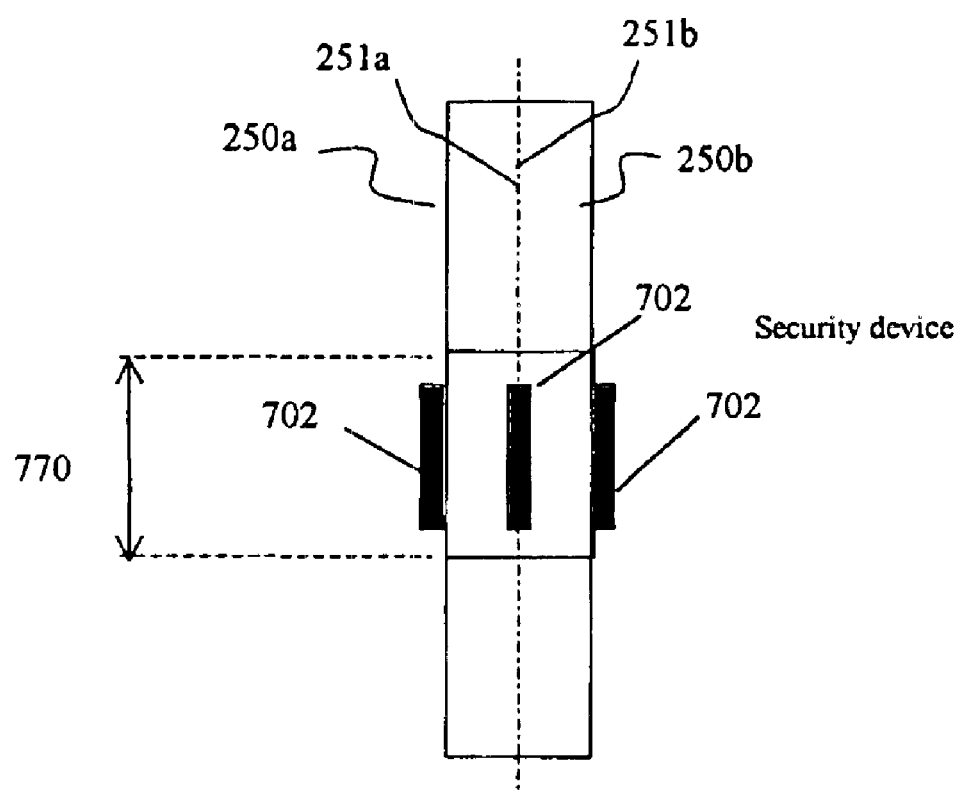
FIG. 27 illustrates alternative placement of security devices on or within a DVD.

FIG. 27 illustrates that a DVD disc may have a security device (e.g., a hologram 702) positioned in a translucent central annular region 700. The security device 702 may be placed exterior to surface 250a or exterior to surface 250b or between surfaces 251a and 251b. For any of these conditions the security device may be sensed/read by sensors located on either side of the disc.

CD/DVD WITH Embedded Rfid Chip

Figure 28:
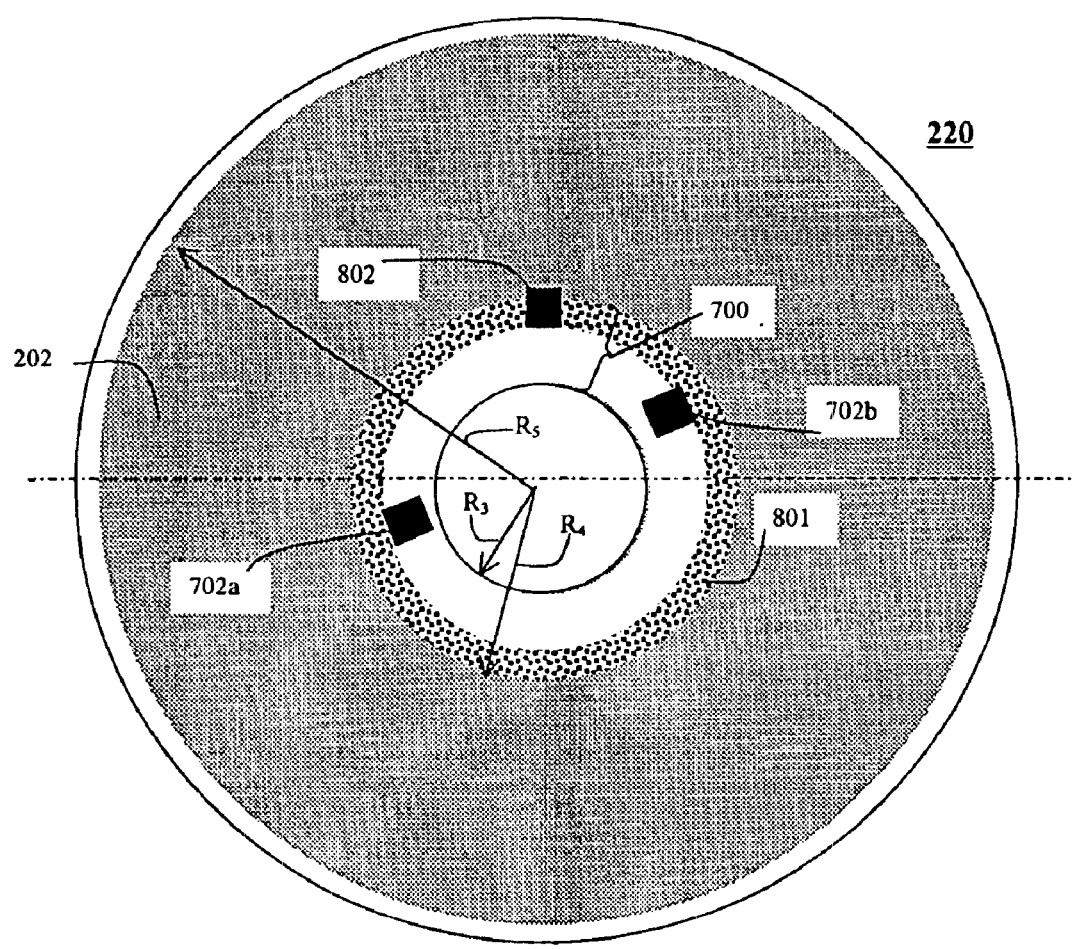
FIGS. 28 and 29 are drawings of a disc with an RFID chip and other security devices located thereon in accordance with the invention.
Figure 29:
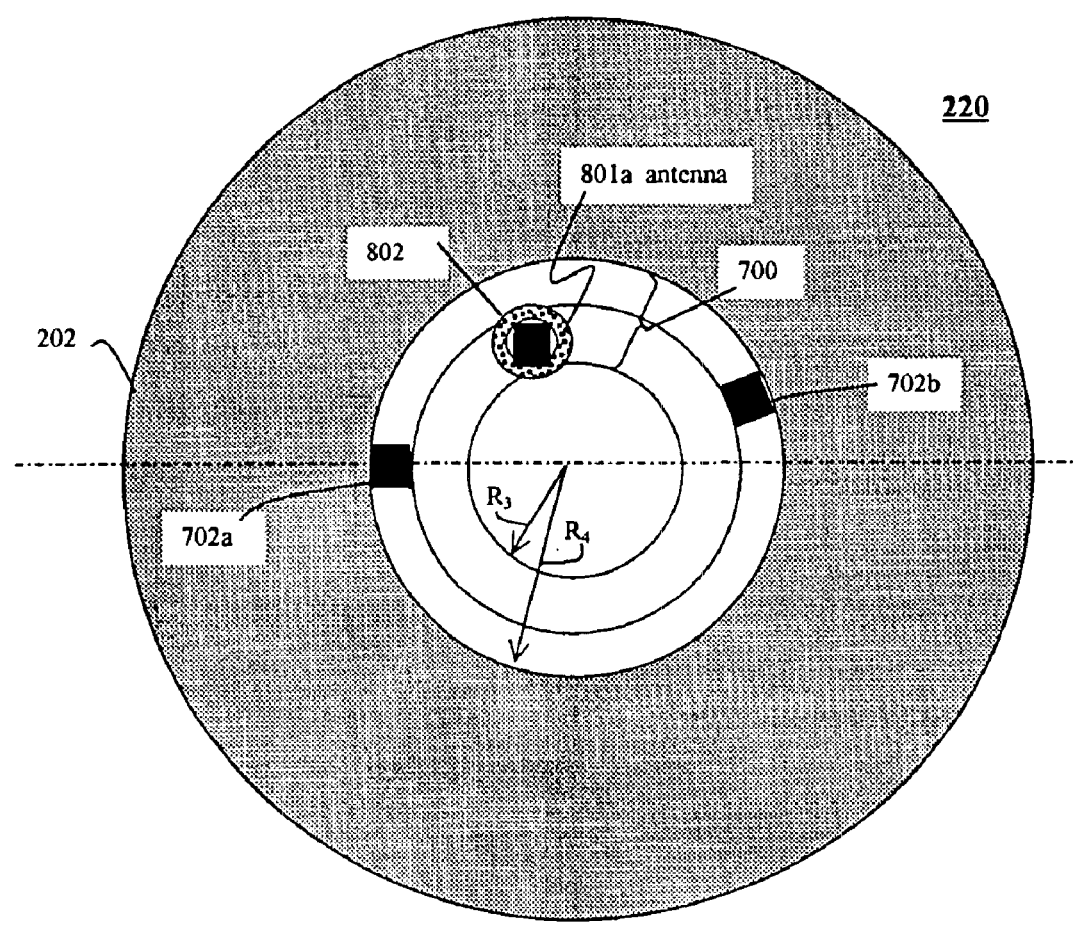

One aspect of the invention includes the recognition that it is possible to embed a radio frequency identification (RFID) chip on, or within, a CD or a DVD to provide a security function (i.e., to impede the counterfeiting of the discs). FIG. 28 shows a disc 220 with an RFID chip 802, mounted within an annular ring 700 along the disc. The RFID chip 802 is coupled to an antenna 801 formed within and along the annular ring 700. [The RFID chip 802 is generally a passive device which is powered and activated when inserted in a reader/player or in encrypting apparatus (e.g., a writer) as discussed below.] In addition to the RFID chip 802, discs embodying the invention may be manufactured to contain several different security elements, as shown in FIGS. 28 and 29. In FIG. 29, an RFID chip 802 is embedded on or within an annular ring 700 with an antenna coil 801a formed around the chip. In addition, security devices 702a, 702b, may be embedded on or within the annular region 700 (or in an adjacent region) in a predetermined or random manner, as discussed above. The security devices 702a, 702b may be holograms or any other suitable security devices, as already discussed.

Figure 30:
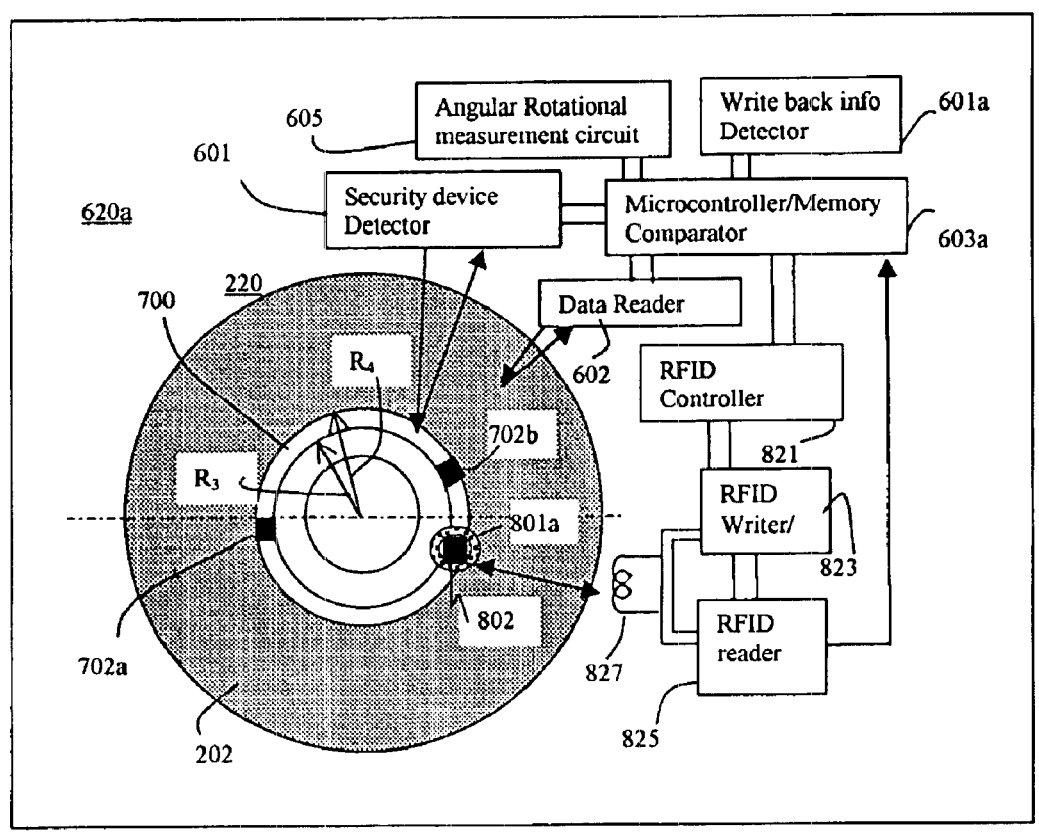
FIG. 30 is a simplified drawing of apparatus embodying the invention for encrypting and/or reading a disc.

To make use of the RFID chip located on/within the disc, a player/reader embodying the invention (i.e., a machine for playing the CD or DVD) includes a reader capable of detecting encrypted security (or any other) information stored in the RFID chip and which is programmed to use the security (or any other) information to authenticate the validity of the CD or DVD. Elements of such a player are shown in FIG. 30 . After authentication of the CD or DVD, the player then enables the CD or DVD to be played/displayed in a normal manner.

I—An RFID chip may be used to provide a security function in the following manner:

(a) Information can be encrypted on or within an RFID chip (prior to placement on or within a disc) and the chip can then be embedded on a disc.—Subsequently, the disc to which an RFID chip is attached can be inserted into a reader/player having circuitry (e.g., an RFID reader 825) for reading the RFID information. The reader/player may be similar to the reader/player of FIGS. 23 or 24 except that it would also include RFID reader circuitry 825 as shown in FIG. 30. Information can thus be sensed by a reader/player which is specially designed to activate the chip 802 and to then sense/read the contents of the chip; with the reader/player being programmed to recognize certain characteristics to determine whether the disc is authentic. Thus, in this type of system, a reader/player having elements shown in 620a of FIG. 30 (except for the writing function which is not needed for reading) into which the disc is inserted for use (e.g., display) by a customer is programmed to activate (e.g., energize) the chip by supplying energy to it (e.g., by means of power transfer from the reader/player via the antenna). The player/reader is also programmed to read and decode the contents of the RFID chip 802. If the decoded information corresponds to a predetermined set of stored information (e.g., in memory controller 603a), the player/reader 620a enables the IP info on the disc to be read and displayed by a reader/player.

(b) Alternatively, an RFID chip can be embedded on or within a disc and, as part of the manufacturing process, the disc can be inserted in an encrypting (writer) machine (e.g., 620a in FIG. 30) which will encrypt information on the chip. The encrypting apparatus will normally include: (i) means (coil 827 coupling to antenna 801 or 801a) for powering and activating the RFID chip; (ii) means (e.g., RFID writer 823) for encrypting (writing information) onto the chip; and (iii)

means (e.g., RFID reader 825) for sensing/reading the contents of the chip. Subsequently, when the disc is ready to be used it will be inserted into a player/reader as described above.

Note that the RFID chip 802 is shown to be mounted within an annular ring extending between a radius R3 and R4, measured from the center of the disc. Locating the chip in a particular area enables the player/reader to be designed so that its elements for activating the chip (e.g., its transformer for supplying energy to the antenna coils surrounding the chip) and the detection of its encrypted information can be accomplished using a minimum amount of power. However, this is not a necessary condition and the various security elements may be located at different sites on the disc.

II—An RFID chip may also be used as part of a system to customize each disc and to store information pertaining to the customization. Thus, by way of example, disc 220 as shown in FIGS. 28–30 may include security devices (e.g., 702a, 702b) disposed along an annular ring of the disc. The holograms may be randomly placed along the annular ring, whereby each disc is unique relative to the placement of the holograms. In the course of manufacturing a disc, the disc can be inserted into an encrypting machine (see FIG. 30) which includes: (a) a laser light source and detector means 601for sensing the holograms (702a, 702b) and information contained in the holograms. The holographic content information can then be fed to a micro-controller/memory circuit 603a which in turn is programmed to control a writer controller circuit 821 which in turn feeds signals to an RFID writer circuit 823 which is used to encrypt information onto RFID chip 802 via antenna 801 or 801a; and (b) angular rotational measurement circuit 605 which can measure the position of one hologram (e.g., 702a) relative to the other hologram (e.g., 702b) and supply that information to circuit 603a which is programmed to then furnish corresponding information to circuits 821 and 823 for encrypting the RFID chip 802 with positional information pertaining to the holograms. [Note that it may also be desirable in some instances to sense the position of the RFID chip and also include that information as part of the information encrypted on the chip.]

III—A system embodying the invention designed to impede the counterfeiting of discs is comprised of a player/reader which may include, like the encrypting machine, a laser light source and detection circuit 601, angular rotational measurement circuitry 605, and micro-controller and memory circuitry 803. In addition, the player/reader includes means 825 for reading information stored in the RFID chip and means (which may be within the controller and memory circuitry 803) for comparing the information obtained from the chip with information sensed by the detector circuit 601 and/or 601a and the angular rotational measurements 605.

What is claimed is:

1. An optical disc comprising:
   a data region for storing data to be read and displayed by a reading device; and
   N security devices located on the disc, outside of said data region, to be sensed by the reading device before the data stored in the data region can be read and displayed; said N security devices being randomly placed relative to each other; where N is an integer greater than 1;
   wherein the disc has a central region and a first annular ring surrounding the central region and wherein the security devices are located in said first annular ring, and wherein the data region is a second region surrounding the first annular ring,
   wherein the security devices are one of a machine readable hologram, an optically variable device (OVD) and a radio frequency identification (RFID) chip and wherein security information pertaining to the security devices and the relative positions of the security devices is encoded on the disc; and
   wherein security information pertaining to the security devices and their relative positions, encoded on the disc, has to be sensed before enabling the data in the second region to be read and displayed.

2. An optical disc as claimed in claim 1 wherein security information pertaining to the security devices is encoded in a selected area in the second region of the disc.

3. An optical disc as claimed in claim 1, wherein the disc includes a top surface and a bottom surface and wherein the security devices are placed between the top and bottom surfaces of the disc.

4. An optical disc as claimed in claim 3, wherein the optical disc is one of a compact disc (CD) and a digital video disc (DVD).

5. An optical disc as claimed in claim 3, wherein the optical disc is a digital video disc (DVD) of the type having two external surfaces; and wherein each external surface contains data to be read by the reading device.

6. An optical disc as claimed in claim 1, wherein the disc has a top protective layer and a bottom protective layer, and wherein the security device is located between the top and bottom protective layers of the disc.

7. An optical disc as claimed in claim 1, wherein the disc has two external surfaces and two internal surfaces, wherein the security devices are located on or between the two external surfaces and wherein the two internal surfaces are bonded to each other.

8. An optical disc as claimed in claim 1 wherein one of the security devices is a reference mark formed on the disc in said first annular ring.

9. An optical disc as claimed in claim 8 wherein security information pertaining to the positional relationship between the reference mark and at least one of the security devices is encoded on the disc.

10. An optical disc as claimed in claim 1 wherein the N security devices are located on or between the top and bottom protective layers of the disc.

11. An optical disc as claimed in claim 10, wherein the N security devices are randomly placed relative to each other between the top and bottom protective layers of the disc.

12. An optical disc as claimed in claim 11 wherein security information pertaining to the security devices and to their location is stored in the disc and wherein said security information pertaining to the security devices and to their location has to be sensed and validated before enabling data in the second region of the disc to be read and displayed.

13. An optical disc as claimed in claim 10 wherein relative positional information pertaining to the location of the randomly located security devices is obtained and then stored on the disc and wherein said relative positional information pertaining to the security devices has to be sensed before enabling the data in the second region of the disc to be read and displayed.

14. An optical disc as claimed in claim 10 wherein said security devices are selected from a group which includes a reference mark, a machine readable hologram, and an optically variable device.

15. An optical disc as claimed in claim 1 wherein the disc includes two platters, each platter having an internal surface and an external surface and wherein the two internal surfaces are bonded to each other; and wherein a security device is located on or between the two external surfaces.

16. An optical disc as claimed in claim 1 wherein one of the security devices includes a radio frequency identification (RFID) chip located on the disc with an antenna associated with the RFID chip also located on the disc; wherein the antenna is for selectively energizing the RFID chip and for selectively sensing information stored in the RFID chip; and wherein the RFID chip is encoded with security information.

17. An optical disc as claimed in claim 16 wherein the RFID chip located on the disc includes selected security information pertaining to selected security devices located on the disc; and wherein said security information is encoded in the RFID chip after it is installed on the disc.

18. An optical disc comprising:
   a central region;
   a first annular region surrounding the central region;
   a second region surrounding the first annular region, said second region for storing data to be read and displayed by a reading device; and
   N security devices located in the first annular region to be sensed by the reading device before allowing the data stored in the second region to be read and displayed; where N is an integer greater than one;
   wherein the disc is one of a compact disc (CD) and a digital video disc (DVD);
and wherein the security device is one of a machine readable hologram with a hidden code, an optically variable device (OVD) and a radio frequency identification (RFID) chip;
   wherein the N security devices are randomly placed; and
   wherein security information pertaining to the security devices and to the relative positions of the security devices is first obtained and then encoded on the disc.

19. An optical disc comprising:
   a region for storing data information to be accessed and displayed by a user; and
   N security devices randomly embedded within the disc for impeding the counterfeiting of the disc, said N security devices containing security information for preventing the data information from being accessed and displayed unless the N security devices are first sensed; where N is an integer greater than one (1); and
   wherein information about the relative positions of selected ones of the N security devices is obtained and encoded in a selected area of the disc.

20. An optical disc as claimed in claim 19 wherein at least one of the N security devices is a hologram and security information pertaining to the hologram is written onto the disc.

21. An optical disc as claimed in claim 19 wherein at least one of the N security devices is an RFID chip and security information is encoded on one of the RFID chip and the disc.

22. An optical disc as claimed in claim 19 wherein at least one of the N security devices is an optically variable device (OVD) and security information pertaining to the OVD is written onto the disc.

23. An optical disc as claimed in claim 19 wherein the disc includes a central annular region surrounded by a second annular region along which the N security devices are positioned and wherein the region for storing data information includes a third annular region surrounding the second annular region.

24. An optical disc as claimed in claim 19 wherein the disc is one of a compact disc (CD) and a digital video disc (DVD).

25. A method for impeding the counterfeiting of an optical disc having a data region containing data to be displayed comprising the steps of:
   randomly attaching N security devices to the disc; where N is an integer greater than one (1);
   sensing the presence, relative location and contents of selected ones of said N security devices;
   processing the sensed information and storing sensed information indicative of the relative locations of the security devices in a selected region of the disc;
   reading and displaying the data to be displayed including the subsequent sensing of the relative locations and contents of selected ones of the N security devices and processing the subsequently sensed information to ascertain that the sensed information pertaining to the relative locations and contents of the security devices corresponds to the stored information in the selected region of the disc; and
   enabling the data contained in the data region to be displayed when it is ascertained that the sensed information corresponds to the previously stored information.

26. A method as claimed in claim 25 wherein the N security devices are one of a hologram, an optically variable device, a reference mark and a radio frequency identification (RFID) chip located in a selected region of the disc.

27. A method as claimed in claim 25 wherein there are at least two security devices attached to the disc.

28. A method as claimed in claim 25 wherein the security devices are attached to the disc along a predetermined annular region dedicated for the attachment therealong of security devices.

29. A method for impeding the counterfeiting of an optical disc having a first region containing data to be displayed comprising the steps of:
   randomly attaching N security devices to the disc; where N is an integer greater than one (1);
   sensing the presence, relative positions and contents of selected ones of said N security devices;
   processing the sensed information and producing corresponding security information; and
   encoding the disc with corresponding security information and storing the corresponding security information pertaining to the selected security devices located on the disc;
   wherein the N security devices are one of a hologram, an optically variable device, a reference mark and a radio frequency identification (RFID) chip; and wherein the N security devices are located in a selected region of the disc; wherein the security information encoded on the disc includes information pertaining to the relative positions of selected ones of the security devices; and the steps of: (a) subsequently sensing at least one of the presence and contents of selected ones of said N security devices, after security information is encoded on the disc; (b) processing the subsequently sensed information to ascertain that the sensed information corresponds to previously encoded security information stored on the disc; and (c) enabling the data contained in the data region to be displayed when it is ascertained that the subsequently sensed information corresponds to the encode stored security information.

30. Apparatus for use with an optical disc having a data region for storing data to be read and displayed and onto which N security devices are attached, where N is an integer greater than one (1), comprising:
   means for sensing the presence, relative positions and contents of selected ones of said N security devices;

means for processing the sensed information to ascertain that the sensed information corresponds to a predetermined stored pattern; and means for enabling the data contained in the data region to be displayed when it is ascertained that the sensed information corresponds to the predetermined stored pattern;

wherein at least one of said N security devices is one of a hologram, and OVD chip; and wherein said means for sensing the presence, positions and contents of selected ones of said N security devices includes means for sensing the contents of one of a hologram, and an OVD chip.

31. The apparatus as claimed in claim 30 wherein said means for sensing the presence and contents of selected ones of said N security devices includes means for sensing the contents of one of a hologram, and an OVD.

32. The apparatus as claimed in claim 31 wherein said apparatus includes microcontroller and memory means for processing the sensed security information.

33. Apparatus for annotating an optical disc onto which N security devices are attached, where N is an integer greater than one (1), comprising:

sensing means for sensing the presence, relative positions and contents of selected ones of said N security devices; and processing means, including writing and encoding means, responsive to the sensing means for generating security information corresponding to the sensed information and storing the corresponding security information pertaining to the security devices on the disc for impeding the counterfeiting of the disc;

wherein at least one of the N security devices is one of a hologram, an OVD and an RFID chip; wherein the sensing means includes means for sensing at least one of a hologram, an OVD and an RFID chip; wherein said processing means includes a microcontroller for processing the sensed information; and wherein said writing and encoding means includes at least one of a laser writer circuit for writing information onto the disc or a hologram, and an RFID writer circuit for annotating the RFID chip.

34. The apparatus as claimed in claim 33 wherein the N security devices are randomly located on the disc, and wherein the sensing means for sensing the presence and contents of selected security devices includes means for sensing the contents and the relative positions of selected ones of the N security devices, wherein the processing means includes a microcontroller for receiving and processing signals indicative of the contents and relative positions of selected ones of the N security devices for producing corresponding signals, wherein one of the security devices is an RFID chip, and wherein the writing and encoding means includes RFID writing means for encoding the RFID chip with security information pertaining to selected ones of the security devices.

35. The apparatus as claimed in claim 33 wherein the N security devices are randomly located along an annular ring of the disc, and wherein said sensing means includes means for sensing the location of selected ones of the N security devices relative to each other along said annular ring.

36. The apparatus as claimed in claim 33 wherein at least one of said N security devices is a hologram and wherein at least one of said N security devices is an RFID chip; wherein said sensing means includes means for sensing security information pertaining to the hologram; wherein said processing means includes means for supplying said security information to a microcontroller circuit for processing said security information; and wherein said writing and encoding means includes means responsive to the microcontroller for encoding signals corresponding to the security information onto the RFID chip.

37. The apparatus as claimed in claim 33 wherein at least one of said N security devices is a hologram; wherein said sensing means includes means for sensing security information pertaining to the hologram; wherein said processing means includes means for supplying said security information to a microcontroller circuit for processing said security information; and wherein said writing and encoding means includes means responsive to the microcontroller for encoding signals corresponding to the security information onto one of the disc and a selected hologram.

38. A system for impeding the counterfeiting of optical discs having a data region containing information useful to a user comprising:

randomly attaching N security devices onto each disc, where N is an integer greater than one; and a reader for reading the data region and also including means for sensing the presence, relative locations and content of said N security devices and said reader being programmed to enable the user to access the data region only after the reader senses relative locations and contents of the N security devices;

wherein the N security devices are attached to the disc within a selected annular ring; and wherein said reader is programmed to sense the presence and relative locations of any security device within said selected annular ring.

39. A system for impeding the counterfeiting of optical discs as claimed in claim 38, wherein the disc includes two platters with the N security devices being located between the internal sides of the two platters, where the internal sides of the two platters are bonded to each other.

40. A system for impeding the counterfeiting of optical discs as claimed in claim 38, further including apparatus for sensing the locations and contents of the N security devices and said apparatus for encoding the disc with security information pertaining to the locations and contents of the N security devices.

41. A system for impeding the counterfeiting of optical discs as claimed in claim 38, wherein at least one of the N security devices is a hologram.

42. A system for impeding the counterfeiting of optical discs as claimed in claim 38, wherein there are at least two security devices attached to each disc.

43. A system for impeding the counterfeiting of optical discs as claimed in claim 38, wherein at least one of the N security devices is a radio frequency identification (RFID) chip.

44. A system as claimed in claim 43 wherein the disc includes an antenna for supplying energy to the RFID chip and for transmitting information from the chip to a reading device.

45. A system for impeding the counterfeiting of optical discs as claimed in claim 38, wherein at least one of the N security devices is an optically variable device (OVD).

46. A system for impeding the counterfeiting of an optical disc having a data region containing information useful to a user comprising:

attaching N security devices to the disc in a portion of the disc other than its data region; where N is an integer greater than one;

apparatus for sensing the security devices including positional information pertaining to the security devices and for writing onto a selected region of the disc security information pertaining to the security devices and the relative positions of the security devices; and a reader for reading the data region and also including means for sensing the presence of the security devices and the relative positions of the security devices and the security information written onto the disc, said reader being programmed to enable the user to access the data region only after it has sensed the presence of the security devices, processed information pertaining to the relative positions of the security devices and the security information.

47. A system for impeding the counterfeiting of optical discs as claimed in claim 46, wherein the N security devices are randomly attached to the disc and wherein one of the security devices is a hologram located within a selected annular ring of the disc.

48. A system for impeding the counterfeiting of optical discs as claimed in claim 46, wherein the N security devices are randomly attached to the disc and wherein one of the security devices is a radio frequency identification (RFID) chip located within a selected annular ring of the disc.

49. A system for impeding the counterfeiting of optical discs as claimed in claim 46, wherein the N security devices are randomly attached to the disc and wherein one of the security devices is an optically variable device.

50. A system for impeding the counterfeiting of optical discs having a data region containing information useful to a user comprising:

embedding N security devices on each disc, where N is an integer greater than one; the security devices being located in a portion of the disc outside the data region;

encrypting apparatus for sensing the N security devices and their locations and in response thereto for writing onto a selected region of the disc security information pertaining to the security devices and the relative locations of the security devices; and a reader for reading the data region and also including means for sensing the presence of the security device and the locations of the security devices and for sensing the security information; said reader being programmed to enable the user to access the data region only after it has sensed the presence of the security device and the locations of the security devices and the security information corresponding thereto.

51. A system as claimed in claim 50 wherein the N security devices are randomly placed on or within the disc, whereby the pattern formed within any particular optical disc may be different from any other optical disc.

* * * * *